US010819755B1

(12) United States Patent
Asveren

(10) Patent No.: US 10,819,755 B1
(45) Date of Patent: Oct. 27, 2020

(54) COMMUNICATIONS APPARATUS, SYSTEMS, AND METHODS FOR PREVENTING AND/OR MINIMIZING SESSION DATA CLIPPING

(71) Applicant: Ribbon Communications Operating Company, Inc., Westford, MA (US)

(72) Inventor: Tolga Asveren, Bordentown, NJ (US)

(73) Assignee: Ribbon Communications Operating Company, Inc., Westford, MA (US)

( * ) Notice: Subject to any disclaimer, the term of this patent is extended or adjusted under 35 U.S.C. 154(b) by 742 days.

(21) Appl. No.: 15/267,149

(22) Filed: Sep. 16, 2016

(51) Int. Cl.
H04L 29/06 (2006.01)
H04L 29/12 (2006.01)
H04L 29/08 (2006.01)

(52) U.S. Cl.
CPC ...... *H04L 65/1069* (2013.01); *H04L 61/2567* (2013.01); *H04L 61/2575* (2013.01); *H04L 65/1006* (2013.01); *H04L 65/608* (2013.01); *H04L 67/14* (2013.01)

(58) Field of Classification Search
CPC ..... H04L 61/256–2589; H04L 65/1069; H04L 61/2567; H04L 61/2575
See application file for complete search history.

(56) References Cited

U.S. PATENT DOCUMENTS

| 9,137,200 | B2* | 9/2015 | Blau | H04L 61/2589 |
| 2010/0146099 | A1* | 6/2010 | Lin | H04L 29/12339 709/224 |
| 2012/0158974 | A1* | 6/2012 | Perumal | H04L 29/12528 709/227 |
| 2015/0030016 | A1* | 1/2015 | Larkin | H04L 65/104 370/352 |
| 2016/0174239 | A1* | 6/2016 | Tietsch | H04L 61/2575 370/329 |
| 2016/0330252 | A1* | 11/2016 | Stahl | H04L 65/608 |
| 2017/0180484 | A1* | 6/2017 | Asveren | H04L 65/1069 |

\* cited by examiner

*Primary Examiner* — Gregory G Todd
(74) *Attorney, Agent, or Firm* — Straub & Straub; Stephen T. Straub; Michael P. Straub

(57) ABSTRACT

The present invention is directed to communications apparatus, systems, and methods for preventing and/or minimizing session data clipping/loss when using the ICE protocol procedures on a session border controller. An exemplary method embodiment of operating a Session Border Controller (SBC) includes, receiving, at the SBC, an initial offer message from a first user equipment device directed to a second user equipment device, said initial offer message including one or more candidate addresses for the first user equipment device; and establishing a data path between the SBC and the second user equipment device in response to receiving said initial offer message prior to establishing a data session between the first user equipment device and the session border controller.

20 Claims, 17 Drawing Sheets

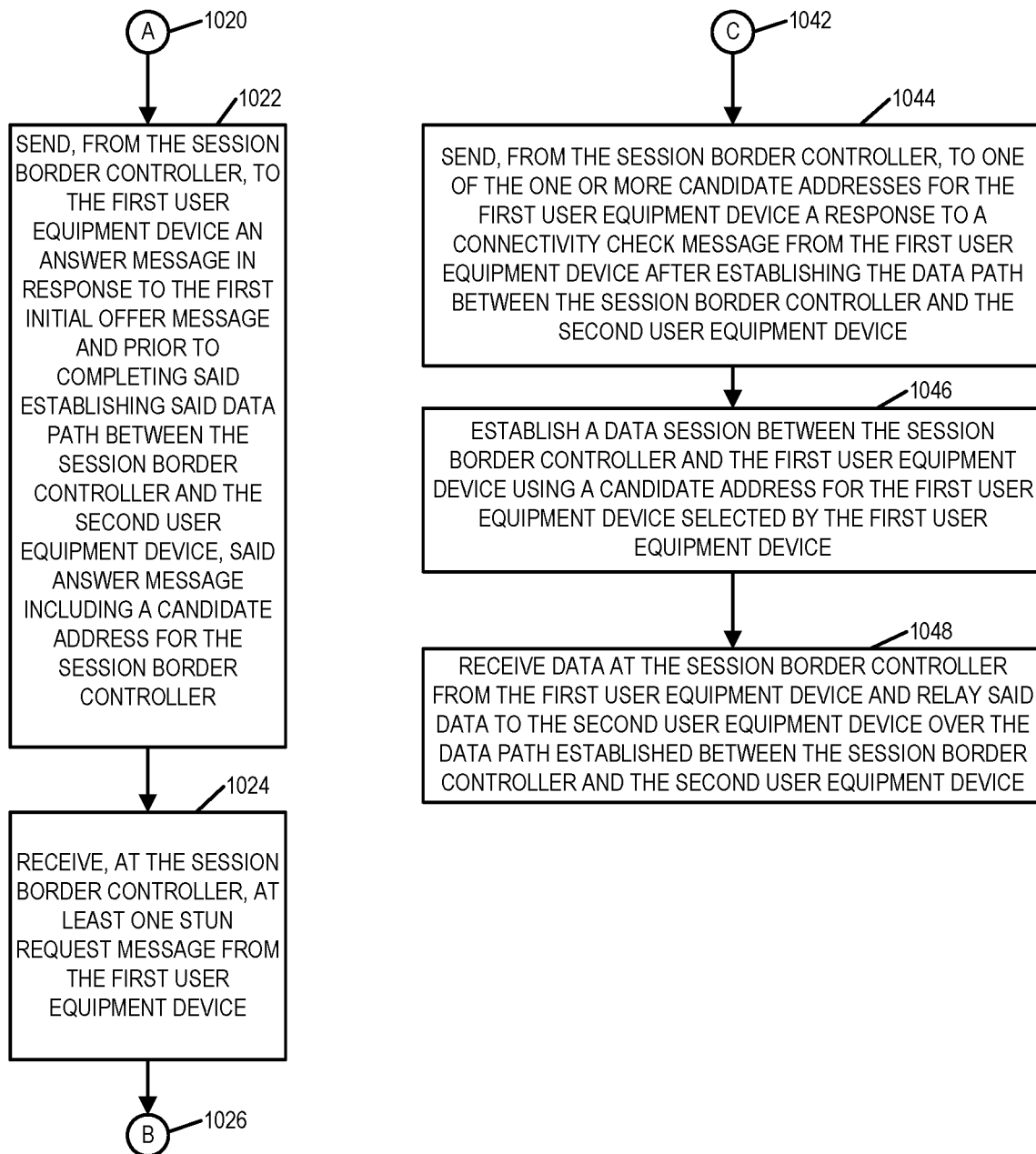

COMMUNICATIONS APPARATUS, SYSTEMS, AND METHODS FOR PREVENTING AND/OR MINIMIZING SESSION DATA CLIPPING

FIELD OF INVENTION

The present invention relates to communications apparatus, systems, and methods for preventing and/or minimizing session data clipping when implementing the Interactive Connectivity Establishment (ICE) protocol procedures.

BACKGROUND

Interactive Connectivity Establishment is a protocol which describes procedures to allow Session Initiation Protocol (SIP) endpoints (sometimes referred to as agents) to establish a data communications path in the presence of Network Address Translator (NAT) devices. At the beginning of the ICE process, while the SIP endpoints can communicate indirectly via SIP, the SIP endpoints are ignorant of their own topologies. For example, the SIP endpoints might or might not be behind a NAT (or mutliple tiers of NATs). ICE allows the SIP endpoints to discover enough about their topologies to potentially find one or more paths by which the SIP endpoints can communicate.

Internet Engineering Task Force (IETF) Request for Comment: 5245 specification published April 2010 entitled: "Interactive Connectivity Establishment (ICE): A Protocol for Network Address Translator (NAT) Traversal for Offere/Answer Protocols" describes the protocol. This specification defines ICE as a technique for NAT traversal for User Datagram Protocol-based media streams but notes that the protocol can be extended to handle other transport protocols such as for example Transmission Control Protocol (TCP).

At a high level, ICE is used to exchange candidate addresses, which can be used for data communication. ICE is implemented by including these candidate addresses/ports (IP addresses and ports) in Session Description Protocol (SDP) offers and answers which may be, and sometimes are, included in SIP messages. These candidate IP address/port pair combinations are then tested for connectivity by peer-to-peer connectivity checks. The IP address/port pair combinations included in the SDP offers and answers and the connectivity checks are performed using STUN requests and responses. STUN packets are sent between candidate addresses/ports once the ICE exchange is completed. These connectivity checks are used to determine which candidate address combinations can be used for communication. ICE exchange also includes username/password to provide integrity protection/authentication for STUN packets. As also indicated in IETF ICE specification RFC 5245, the presence of a SBC between two peers using ICE negotiation introduces issues for which no solutions are defined.

FIG. 1 shows a signaling diagram 100 for establishing a data session between user equipment device 1 (UE 1) 102 and user equipment device 2 (UE 2) 104 using the ICE protocol. In the signaling diagram 100, UE 1 102 is the controlling agent and UE 2 104 is the controlled agent. As the controlling agent, UE 1 102 makes the final determination as to which IP address/port pair will be used for exchanging messages in the data session, e.g., media session, to be established between UE 1 102 and UE 2 104. The process begins in step 106. In step 106, UE 1 102 generates and transmits a SIP Invite message 108 to UE 2 104. The SIP Invite message 108 includes a SDP offer message 109 including ICE attributes. The ICE attributes are candidate-1: M, candidate-2: N, username-A and password-A. The candidate-1: M attribute identifies a first candidate source IP address and port number upon which the recipient should perform connectivity checks for establishing a data session with UE 1 102. M representing the first candidate IP address and port number pair. An exemplary IP address and port number pair is IPV4 IP address=173.14.251.1 and port number=2. The ICE attribute candidate-2: N identifies a second candidate source IP address and port number pair upon which the recipient may perform connectivity checks for establishing a data session with UE 1 102. The attribute username: A identifies the username for the UE 1 102 and the attribute password identifies the password for UE 1 102. The username and password as described above provide integrity protection/authentication for the STUN messages exchanged during the ICE procedure. Operation proceeds from step 106 to step 110.

In step 110, the UE 2 104 receives the SIP Invite 108 message including the SDP offer message 109. Operation proceeds from step 110 to step 112.

In step 112, the UE 2 104 generates and transmits SIP 18X message 114 to UE 102 in response to the SIP Invite message 108. The SIP 18X message 114 includes a SDP answer message 115 which is the answer to SDP offer message 109. The SDP answer message 115 includes ICE attributes: candidate-1: O, candidate-2: P, username-B, and password-B. The candidate-1: O attribute identifies a first candidate source IP address and port number pair upon which the recipient in this case UE 1 102 should perform connectivity checks for establishing a data session with UE 2 104. O identifying the first candidate IP address and port number pair. The ICE attribute candidate-2: P identifies a second candidate source IP address and port number pair upon which the recipient in this case UE 1 102 may perform connectivity checks for establishing a data session with UE 2 104. The attribute username: B identifies the username for the UE 2 104 and the attribute password password-B identifies the password for UE 2 104. The username and password as described above provide integrity protection/authentication for the STUN messages exchanged during the ICE procedure. Operation proceeds from step 112 to step 116.

In step 116, UE 1 102 receives the SIP 18X message 114. Operation proceeds from step 116 to step 118. At this point in the process both UE 1 102 and UE 2 104 contain a complete list of each other's candidate IP address/port pairs. Both UE 1 102 and UE 2 104 pair up the candidates, resulting in candidate pairs. To see which of the candidate pairs works, one or both of the user equipment devices schedules a series of connectivity checks. Each connectivity check is a STUN request/response transaction that the user equipment device will perform on a particular candidate pair by sending a STUN request from the local candidate address/port pair to the remote candidate address/port pair. The address/port pair combinations are (M,O), (M,P), (N,O) and (N,P) from the perspective of the UE 1 102.

In step 118, UE 1 102 generates and transmits STUN request 120 with a source address/port pair M and a destination address/port pair O to UE 2 104. The STUN request 120 fails to reach UE 2 104 as indicated by the X at step 122. The failure may be due to the STUN request being blocked by a NAT or firewall in front of or associated with UE 1 102, a NAT or firewall in front of or associated with UE 2 104 or NAT or firewall somewhere in between UE 1 102 and UE 2 104.

Signaling steps 124, 128 and signaling STUN messages 126 represent a successful connectivity check in which UE 1 102 generates and transmits a STUN request with a source address/port pair M and a destination address/port pair P to UE 2 104 and UE 2 104 responds to the STUN request with a STUN response sent from address/port pair P of UE 2 104 and which is received by UE 1 102 at address/port pair M.

In step 130, UE 1 102 generates and transmits a STUN request 132 with a source address/port pair N and a destination address/port pair O to UE 2 104. The STUN request 132 fails to reach UE 2 104 as indicated by the X at step 134.

Signaling steps 136, 140 and signaling STUN messages 138 represent a successful connectivity check in which UE 1 102 generates and transmits a STUN request with a source address/port pair N and a destination address/port pair P to UE 2 104 and UE 2 104 responds to the STUN request with a STUN response sent from UE 2 address/port pair P and which is received by UE 1 102 address/port pair N.

Once the connectivity checks for each of the candidate address/port pair combinations have been completed, in step 142 the controlling ICE agent UE 1 102 determines which of STUN connectivity checks which were successful will be used for exchanging data in the data session. In this example, the STUN (M, P) and STUN (N, P) connectivity checks were successful and UE 1 102 decides to use STUN (N, P) for data exchange for the session. Operation proceeds to step 150, in which UE 1 102 transmits session data (N, P) 152 to UE 2 104 using the IP address port pair N for UE 1 102 and the address port pair P for UE 2 104. In step 154, UE 2 104 receives the session data 152 which may be for example Real Time Transport Protocol (RTP) packets carrying data packet payloads. In this example, there is no data clipping because the connectivity checks have been completed before the controlling agent UE 1 102 begins transmitting session data.

However, when Session Border Controllers (SBCs) and other similar intermediary devices anchor media between the endpoint devices which are attempting to establish a session, the SBCs or other intermediary devices terminate ICE and STUN messages. STUN connectivity checks are run independently on each leg of a session, which can cause session data clipping as an endpoint device may start sending session data as soon as a STUN connectivity check is successful and it decides to use that candidate address pair combination.

FIG. 2 shows a signaling diagram 200 for establishing a data session between user equipment device 1 (UE 1) 102 and user equipment device 2 (UE 2) 104 with the data being anchored by SBC 106. SBC 106 is a standard session border controller configured as a back-to-back user agent which terminates both legs of the session. In the first leg of the session being established between UE 1 102 and SBC 106, UE 1 102 is the controlling agent and SBC 106 is the controlled agent. In the second leg of the session being established, SBC 106 is the controlling agent and UE 2 104 is the controlled agent. While not shown in FIG. 2 one or more NAT and/or NAPT (Network Address Port Translation) devices may be located between the UE 1 102 and standard SBC 106. Similarly, one or more NAT and/or NAPT devices may be located between standard SBC 106 and UE 2 104.

UE 1 102 and UE 2 104 of FIG. 2 are the same as or similar to UE 1 102 and UE 2 104 of FIG. 1. The method starts in step 202 in which the UE 1 102 generates and transmits SIP Invite message 204 to standard SBC 106. The SIP Invite message 204 includes an SDP offer message 206 including ICE attributes candidate-1: M, candidate-2: N, username-A, password-A. The candidate-1: M attribute identifies a first candidate source IP address and port number pair upon which the recipient should perform connectivity checks for establishing a data session with UE 1 102. M representing the first candidate IP address and port number pair. The ICE attribute candidate-2: N identifies a second candidate source IP address and port number upon which the recipient may perform connectivity checks for establishing a data session with UE 1 102. The attribute username: A identifies the username for the UE 1 102 and the attribute password-A identifies the password for UE 1 102. The username and password as described above provide integrity protection/authentication for the STUN messages exchanged during the ICE procedure. Operation proceeds from step 202 to step 208.

In step 208, the standard SBC 106 receives the SIP Invite message 204 with the SDP offer message 206. Operation proceeds from step 208 to step 210.

In step 210, the standard SBC 106 generates SIP INVITE message 212 to UE 2 104. The SIP Invite message 212 includes SDP offer message 214 which include the following ICE attributes: candidate-1: SBC-IP-1, username-S and password-S. The ICE attribute candidate-1 identifies a first candidate source IP address and port number upon which the recipient may perform connectivity checks for establishing a data session with the standard SBC 106. Only a single candidate address port pair SBC-IP-1 is provided because the IP address port pair is a public IP address port pair and as such the IP address port pair is reachable by entities on the Internet. The username-S and password-S are for the standard SBC 106 are used as described above to provide integrity protection/authentication for the STUN messages exchanged during the ICE procedure. Once the SIP Invite message 212 has been generated it is transmitted from the standard SBC 106 to the UE 2 104. Operation proceeds from step 210 to step 216.

In step 216, UE-2 104 receives and processes the SIP Invite message 212 with the SDP offer message 214. Operation proceeds from step 216 to step 218. In step 218, UE 2 104 generates SIP 18X response message 220 in response to the SIP Invite message 212. The SIP 18X response message 220 includes a SDP answer message 222 including the following ICE attributes: Candidate-1: O, Candidate-2: P, Username-B, Password-B. The candidate-1: O attribute identifies a first candidate source IP address and port number pair upon which the recipient in this case standard SBC 106 should perform connectivity checks for establishing a data session with UE 2 104. O representing the first candidate IP address and port number pair. The ICE attribute candidate-2: P identifies a second candidate source IP address and port number upon which the recipient in this case standard SBC 106 may perform connectivity checks for establishing a data session with UE 2 104. The attribute username: B identifies the username for the UE 2 104 and the attribute password-B identifies the password for UE 2 104. The username and password as described above provide integrity protection/ authentication for the STUN messages exchanged during the ICE procedure. The generated SIP 18X response message 220 is transmitted from UE 2 104 to standard SBC 106. Operation proceeds from step 218 to step 224.

In step 224, the standard SBC 106 receives and processes the SIP 18X response message 220 including the SDP answer 222. Operation proceeds from step 224 to step 226.

In step 226, the standard SBC 106 generates a SIP 18X response message 228 including a SDP answer message 230 to the SDP offer message 206. The SDP answer message 230 includes the following ICE attributes: Candidate-1: SBC-IP2, Username-T, Password-T. The candidate-1: SBC-IP2 attribute identifies a first candidate source IP address and port number pair upon which the recipient in this case UE 1 102 should perform connectivity checks for establishing a data session with standard SBC 106. Only a single candidate address port pair SBC-IP-2 is provided because as explained with respect to the SBC-IP-1 address port pair, the IP address port pair provided for SBC 106 is a public IP address port pair and as such the IP address port pair SBC-IP-2 is reachable by entities on the Internet. The username-T and password-T are for the standard SBC 106 and are used as described above to provide integrity protection/authentication for the STUN messages exchanged during the ICE procedure. The generated SIP 18X response message 228 is transmitted from standard SBC 106 to standard UE 1 102. Operation proceeds from step 226 to step 232.

In step 232, UE 1 102 receives and processes the SIP 18X response message 228 including the SDP answer 230. Operation proceeds from step 232 to step 234.

Signaling steps 234, 238 and signaling STUN messages 236 represent a successful connectivity check in which UE 1 102 generates and transmits a STUN request with a source address/port pair M and a destination address/port pair SBC-IP-2 to standard SBC 106 and standard SBC 106 responds to the STUN request with a STUN response sent from SBC 106 IP address/port pair SBC-IP-2 and which is received by UE 1 102 address/port pair M.

Signaling steps 240, 244 and signaling STUN messages 242 represent a successful connectivity check in which UE 1 102 generates and transmits a STUN request with a source address/port pair N and a destination address/port pair SBC-IP-2 to standard SBC 106 and standard SBC 106 responds to the STUN request with a STUN response sent from SBC 106 IP address/port pair SBC-IP-2 and which is received by UE 1 102 address/port pair N.

In step 246, the UE 1 102 which is the controlling ICE entity in connection with the communications session being established between UE 1 102 and the SBC 106, after successfully completing the stun connectivity checks for both candidate combinations (M, SBC-IP-2 and (N, SBC-IP-2) makes the decision to use (M, SBC-IP-2) combination and start sending session data. Operation proceeds from step 246 to step 248.

In step 248, the UE 1 102 generates and sends session data 250, e.g., RTP messages including media data such as audio from source address/port pair M of UE 1 102 to destination address/port pair SBC-IP-2 of standard SBC 106. The session data messages include source address/port pair M and destination address/port SBC-IP-2. Operation proceeds from step 248 to step 252.

In step 252, the standard SBC 106 receives the session data 250, e.g., RTP messages sent by UE 1 102. Operation proceeds from step 252 to step 253. In step 253, the standard SBC 106 cannot relay the session data it receives to UE 2 104 as the SBC 106 STUN connectivity checks between the standard SBC 106 and UE 2 104 have not yet completed. This results in loss or clipping of the session data 250.

Operation proceeds from step 253 to step 254. Signaling steps 254, 258 and signaling STUN messages 256 represent a successful connectivity check between SBC 106 SBC-IP-1 address/port and UE 2 104 IP address/port O. In the connectivity check, standard SBC 106 generates and transmits a STUN request with a source address/port pair SBC-IP-1 and a destination address/port pair O to UE 2 104 and UE 2 104 responds to the STUN request with a STUN response sent from UE 2 104 address/port pair O and which is received by standard SBC 106 at address/port pair SBC-IP-1. The UE 2 104 could also generate and send the initial STUN message and standard SBC 106 could respond to the STUN message. Operation proceeds to step 260.

Signaling steps 260, 264 and signaling STUN messages 262 represent a successful connectivity check between SBC 106 SBC-IP-1 address/port and UE 2 104 IP address/port P. In the connectivity check, standard SBC 106 generates and transmits a STUN request with a source address/port pair SBC-IP-1 and a destination address/port pair P to UE 2 104 and UE 2 104 responds to the STUN request with a STUN response sent from UE 2 104 address/port pair P and which is received by standard SBC 106 address/port pair SBC-IP-1. The UE 2 104 could also generate and send the initial STUN message and standard SBC 106 could respond to the STUN message. Operation proceeds to step 266 after successful completion of the connectivity checks.

In step 266, after successful stun connectivity checks for both candidate combinations (SBC-IP-1,O) and (SBC-IP-1,P), standard SBC 106 which is the controlling ICE agent in this case makes the decision to use the (SBC-IP-1,O) combination and notifies UE 2 104. SBC 106 can now relay session data it receives from UE 1 102 to UE 2 104 as shown in steps 268, 272, 274 and 278.

In step 268, UE 1 102 transmits session data 270 from address/port M to SBC 106 address/port SBC-IP-2. The session data may be RTP messages for example. In step 272, the standard SBC 106 receives the session data, e.g., RTP messages from UE 1 102. Operation proceeds from step 272 to step 274. In step 274, the SBC 106 sends session data 276 which is the relayed session data 270, e.g., re-packaged session data 270 RTP messages from SBC-IP-1 address/port of the SBC to UE 2 104 address/port O. Operation proceeds from step 274 to step 278.

In step 278, UE 2 104 receives the session data 276.

Because the connectivity checks for each leg of the call are performed independently, data clipping is occurring. As explained above because the standard SBC 106 and UE 2 104 had not completed its connectivity checks and selected the ICE candidate address/port pair combination to be used for the exchange of data between SBC 106 and UE 2 104 when UE 1 102 began sending session data, session data sent was lost. Only after the connectivity checks between the standard SBC 106 and the UE 2 104 were completed could the SBC 106 forward or relay the session data to the intended recipient UE 2 104.

The clipping or loss of data from a user originating a call or session is particularly problematic in those instances wherein the initial data is used by a called service for authentication or validation such as for example when a user calls a service which requires the entry of a PIN. If for example when a user calls a service which requires the user to enter a PIN and the data is lost the user will be required to re-enter th pin or in some instances may be denied the service because of the lost or clipped data.

From the foregoing, it should be appreciated that there is a need for new and improved methods of using ICE procedures for devices such as SBCs when anchoring media so that loss or clipping of data is minimized or eliminated.

SUMMARY

The present invention is directed to communications apparatus, systems, and methods for preventing and/or minimizing session data clipping when implementing the Interactive Connectivity Establishment (ICE) protocol procedures. The present invention addresses and is directed to overcoming the aforementioned problems with computer networks and ICE protocol procedures.

In an exemplary apparatus embodiment of the invention a session border controller comprises: a first receiver; and a processor configured to control said session border controller to: receive, by said first receiver, a first initial offer message from a first user equipment device directed to a second user equipment device, said initial offer message including one or more candidate addresses for the first user equipment device; and establish a data path between the session border controller and the second user equipment device in response to receiving said first initial offer message prior to establishing a data session between the first user equipment device and the session border controller.

In some embodiments, the session border controller further comprises: a first transmitter, and a second receiver, and the processor as part of being configured to control the session border controller to establish a data path between the session border controller and the second user equipment device includes being configured to control the session border controller to: (i) transmit, from said first transmitter, to the second user equipment device a second initial offer message, the second initial offer message including a first candidate address for the session border controller; (ii) receive, at the second receiver, a first response message from the second user equipment device in response to the second initial offer message, the first response message including one or more second candidate addresses for the second user equipment device; and (iii) use one of the one or more second candidate addresses for the second user equipment device to direct messages to the second user equipment device.

In some embodiments, the processor as part of being configured to control said session border controller to establish a data path between the session border controller and the second user equipment device includes being configured to control said session border controller to identify from the one or more candidate addresses for the second user equipment device an address to use for communications with the second user equipment device for the data path.

In some embodiments, the processor is further configured to control the session border controller as part of the establishing a data path between the session border controller and the second user equipment device to: (i) identify a first candidate address for the session border controller; (ii) generate a list of session border controller and second user equipment device candidate address pairs; and (iii) perform a connectivity check on one or more of the candidate address pairs included in the generated list of candidate address pairs.

In some embodiments, the processor is further configured to control said session border controller to select the second user equipment device candidate to use for communications with the second user equipment device for the data path from one of the candidate address pairs that successfully passed said connectivity check as part of being configured to control said session border controller to identify from the one or more candidate addresses for the second user equipment device an address to use for communications with the second user equipment device for the data path.

In some embodiments, the processor is further configured to control the session border control to perform the connectivity checks for each of the candidate address pairs in parallel. In some embodiments, there are multiple candidate address pairs on which connectivity checks are performed in parallel.

In some embodiments, the session border controller is implemented to use proxy addresses. For example, in some embodiments, the processor of the session border controller is further configured to control said session border controller as part of establishing a data path between the session border controller and the second user equipment device to: (i) send, from the session border controller, to the second user equipment device a second initial offer message, said second initial offer message including a proxy candidate address for the session border controller for each candidate address for the first user device received in the first initial offer message; (ii) receiving, at the session border controller, a first response message from the second user equipment device in response to the second initial offer message, the first response message including one or more second candidate addresses for the second user equipment device; and (iii) using one of the one or more second candidate addresses for the second user equipment device to direct messages to the second user equipment device.

The invention is also directed to various communications methods which when implemented reduce, minimize and/or eliminate data loss and/or clipping of session data by session border controllers that host data/media and utilize the ICE protocol.

In an exemplary method of operating a session border controller, the method comprises: receiving, at the session border controller, a first initial offer message from a first user equipment device directed to a second user equipment device, said initial offer message including one or more candidate addresses for the first user equipment device; and establishing a data path between the session border controller and the second user equipment device in response to receiving said first initial offer message prior to establishing a data session between the first user equipment device and the session border controller.

In some embodiments, the step of establishing a data path between the session border controller and the second user equipment device includes: sending, from the session border controller, to the second user equipment device a second initial offer message, said second initial offer message including a first candidate address for the session border controller; receiving, at the session border controller, a first response message from the second user equipment device in response to the second initial offer message, the first response message including one or more second candidate addresses for the second user equipment device; and using one of the one or more second candidate addresses for the second user equipment device to direct messages to the second user equipment device.

In some embodiments, the step of establishing a data path between the session border controller and the second user equipment device further includes identifying from the one or more candidate addresses for the second user equipment device an address to use for communications with the second user equipment device for the data path. In some such embodiments, the step of establishing a data path between the session border controller and the second user equipment device further includes: identifying a first candidate address for the session border controller; generating a list of session border controller and second user equipment device candidate address pairs; and performing a connectivity check on one or more of the candidate address pairs included in the generated list of candidate address pairs.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE DRAWINGS

FIG. 10 illustrates the combination of FIGS. 10A and 10B.

FIG. 10B illustrates a second part of an exemplary method in accordance with an embodiment of the present invention.

DETAILED DESCRIPTION

The present invention provides several mechanisms for addressing the session data loss/clipping problem experienced by data sessions in which an SBC anchors media for a data session as discussed above. In a first mechanism, the data session has two legs, the first leg being from a first user device or peer device to the SBC and the second leg being from the SBC to a second user device or peer device. For each ICE candidate address received on the first leg of the session, the SBC uses a proxy candidate address for the second leg. STUN packets used for connectivity checks are sent to the second user device or peer device only after a STUN packet is received from the first device. Similarly, for each ICE candidate address received on the second leg of the session, the SBC uses a proxy candidate address for the first leg. STUN packets used for connectivity checks are sent to the first user device or peer device only after a STUN packet is received from the second device. While the SBC attempts to assume the controlled agent role for one leg and the controlling role for the other leg, the mechanism can function properly even if it assumes the same role for both legs. In such a case, the STUN requests received for a combination are buffered until a STUN request is received on the other leg for the combination with the corresponding proxy address. An exemplary embodiment using this STUN proxying mechanism is discussed and shown in further detail below in connection with the signaling diagram and method illustrated in FIG. 4.

In a second mechanism, the data session has two legs, the first leg being from a first user device or peer device to the SBC and the second leg being from the SBC to a second user device or peer device. The SBC uses a single candidate address (assuming that it has a routable IP address in the corresponding IP network) but generates and transmits multiple STUN packets for each STUN packet it receives. An exemplary embodiment using this STUN multiplying mechanism is discussed and shown in further detail below in connection with the signaling diagram and method illustrated in FIG. 5.

In both the STUN proxying and STUN multiplying mechanisms, the SBC establishes a data path between the SBC and the second user device or peer device before responding to STUN requests/continuity checks on the first data path between the first user device or peer device and the SBC in this way avoiding clipping of data being sent from the first user device or peer device to the SBC given the first user device initiated the request for a data session with the second user device or peer device. In some embodiments, the SBC activates the established second data path after receiving an activation from the first user device in connection with the first data path between the first user device or peer device and the SBC.

Figure 1:
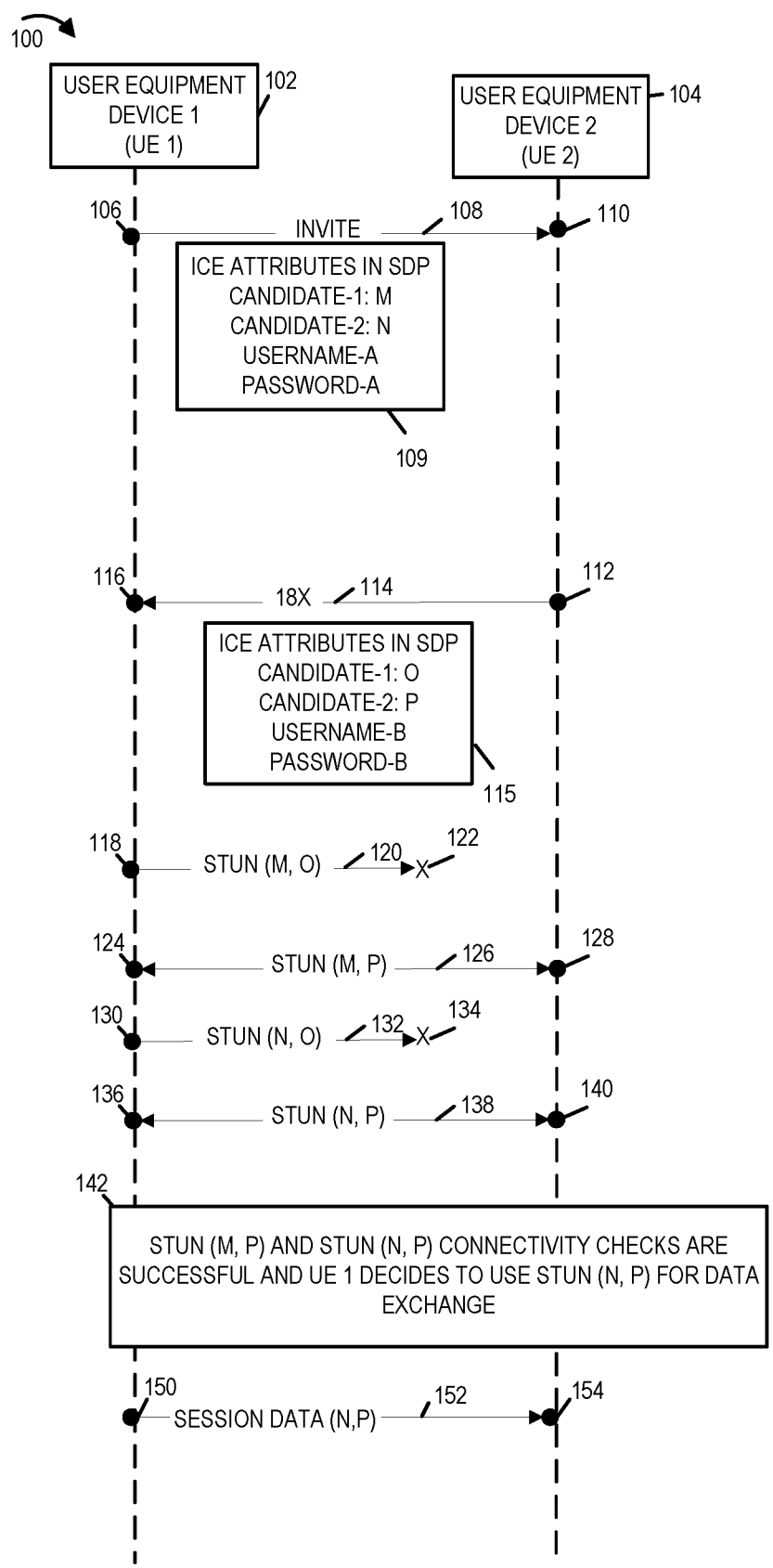
FIG. 1 illustrates a signaling diagram illustrating data session establishment between two user devices using ICE procedures.
Figure 2:
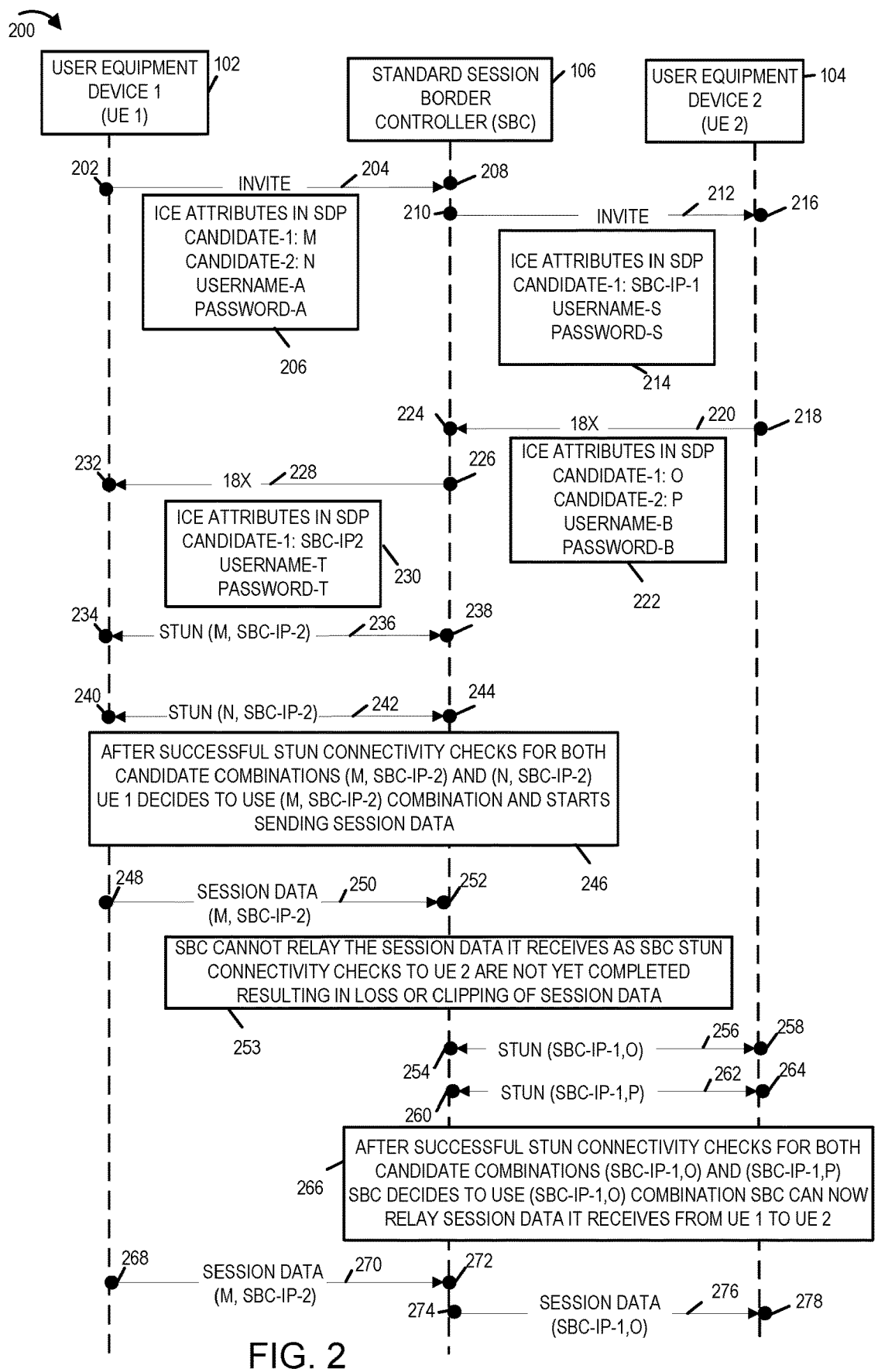
FIG. 2 illustrates a signaling diagram illustrating session data loss/clipping when a standard session border controller anchors the data session between two user devices.
Figure 3:
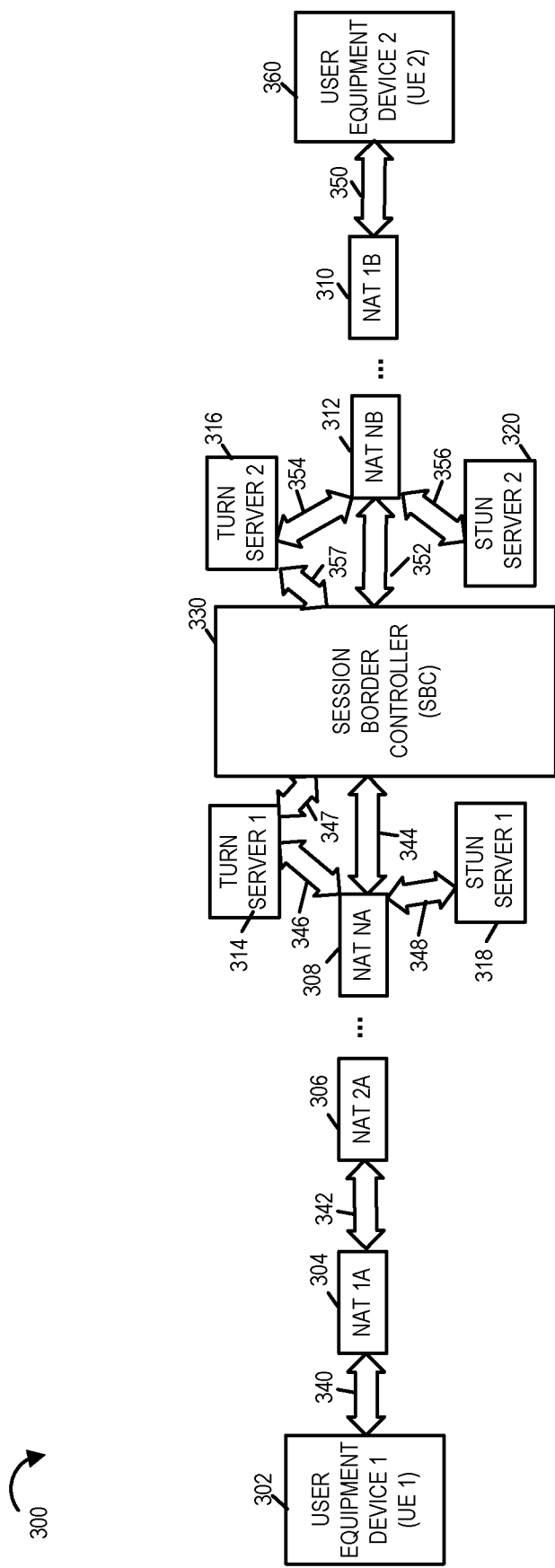
FIG. 3 illustrates an exemplary system in accordance with an embodiment of the present invention.

FIG. 3 illustrates an exemplary communications system 300 in accordance with an exemplary embodiment of the present invention. The system 300 includes user equipment device 1 (UE 1) 302, user equipment device 2 (UE 2) 360, Network Address Translator (NAT) 1A 304, NAT 2A 306, . . . , NAT NA 308, Turn (Traversal Using Relays Around NAT) Server 1 314, STUN Server 1 318, Session Border Controller (SBC) 330, Turn Server 2 316, STUN server 2 320, NAT 1B 310, . . . , NAT NB 312 and communications network including communications links 340, 342, 344, 346, 347, 348, 350, 352, 354, 357, and 357. UE 1 302 is coupled to SBC 330 via NAT devices (NAT 1A, NAT 2A, . . . , NAT NA), TURN Server 1 314 and communications links 340, 342, . . . , 344, 346 and 347. UE 2 360 is coupled to SBC 330 via NAT devices (NAT 1B 310, . . . , NAT NB 312), TURN Server 2 316 and communications links 350, . . . , 352, 354 and 357. While the exemplary embodiment includes TURN Servers 1 and 2 they are not necessary for the implementation of the invention and are optional. UE 1 302 and UE 2 360 may be, and typically are located in separate private networks behind one or more NATs. In the example, both UE 1 302 and UE 2 360 have a plurality of NAT devices located on the path between them. In some embodiments, UE 1 302 and/or UE 2 360 are peer communications devices such as for example session border controller devices. The Turn Server 1 314 and/or Turn Server 2 316 are optionally devices. When a TURN server is included in the system the data/media of a session are proxyed through the TURN server. For example, when UE 1 302 sends media/data to SBC 330 it will traverse the TURN Server 1 314.

Figure 4:
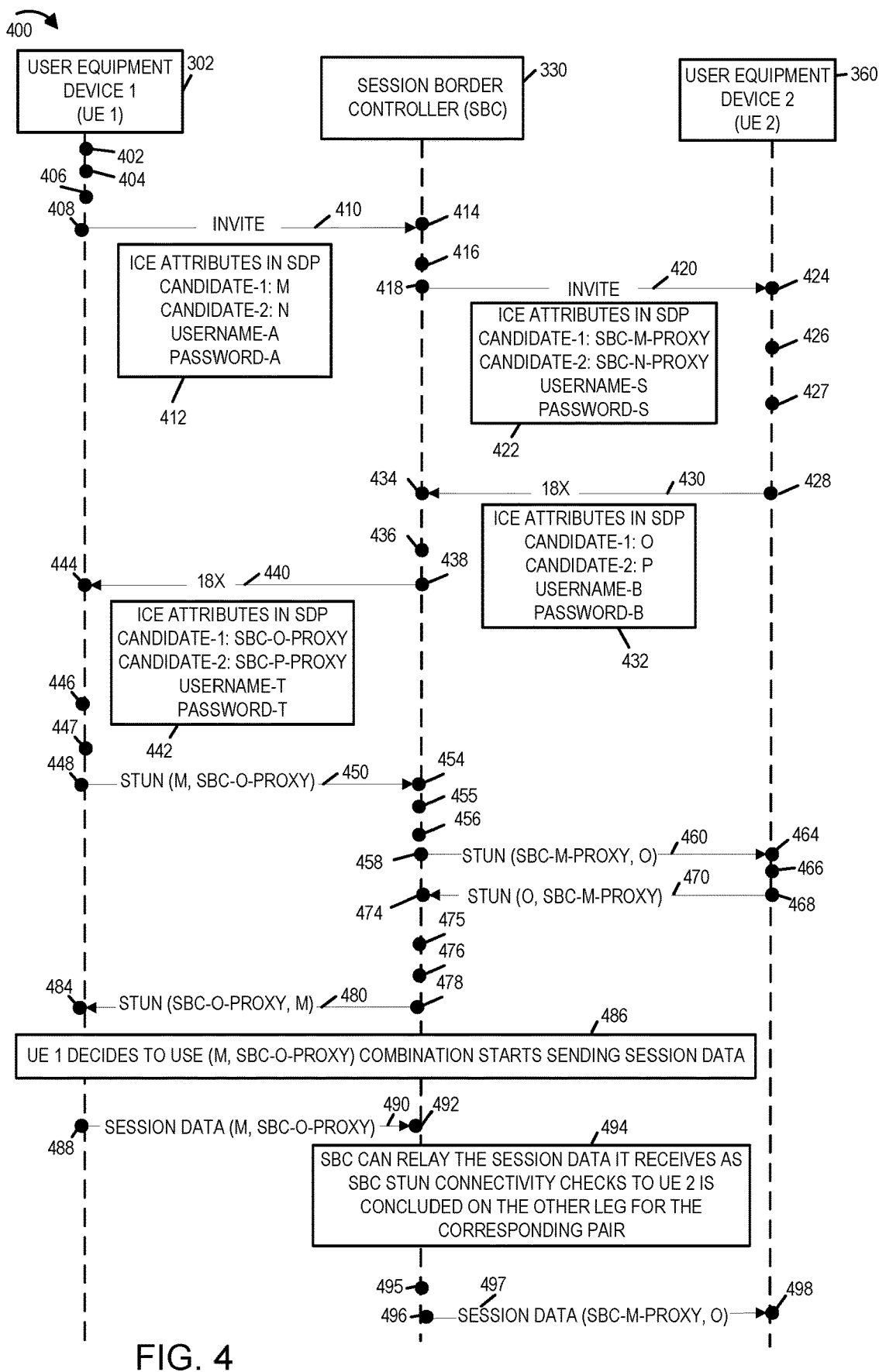
FIG. 4 illustrates the steps and associated signaling exchange between various devices performed in an exemplary method in accordance with an exemplary embodiment.
Figure 5:
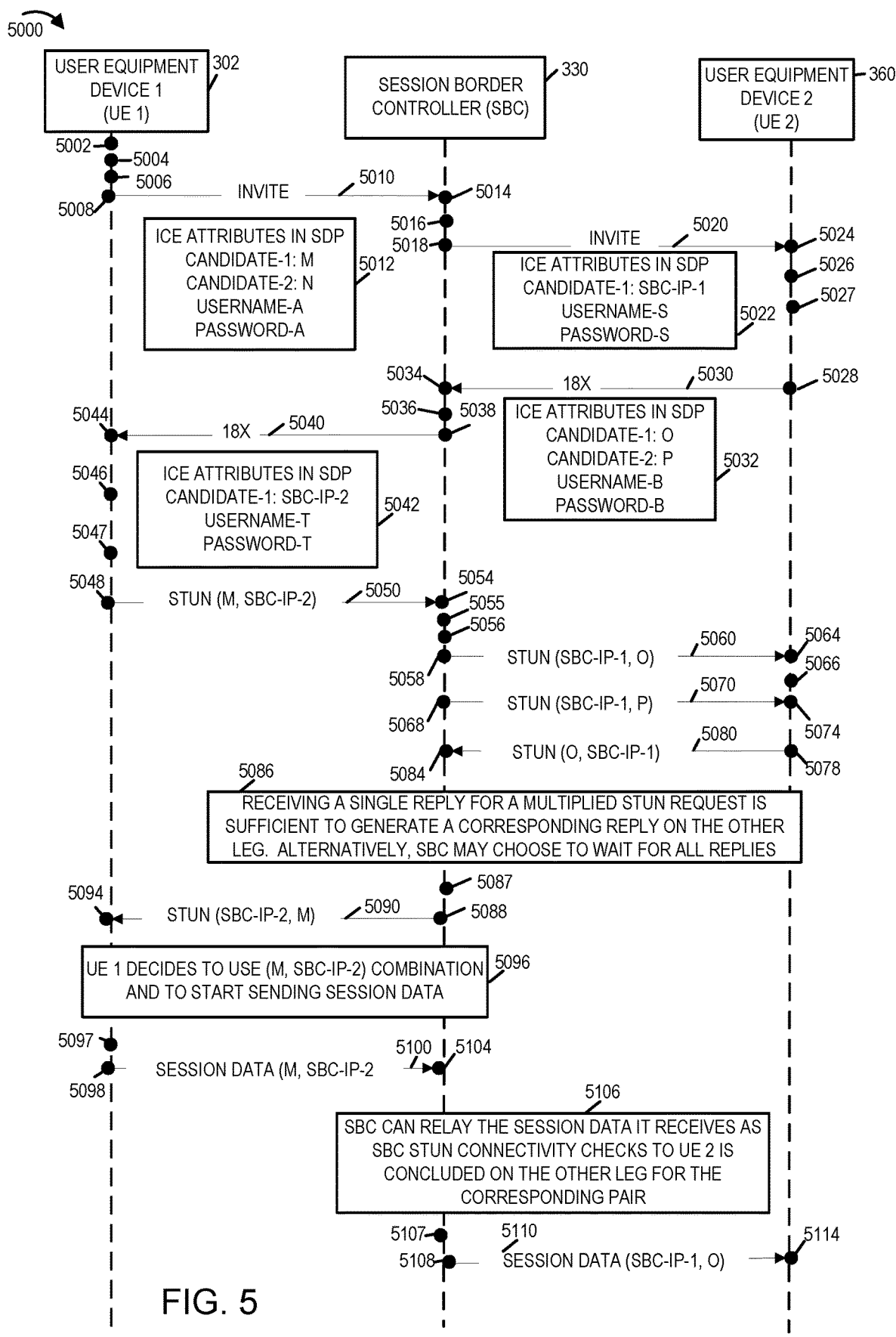
FIG. 5 illustrates the steps and associated signaling exchange between various devices performed in another exemplary method in accordance with an exemplary embodiment.
Figure 6:
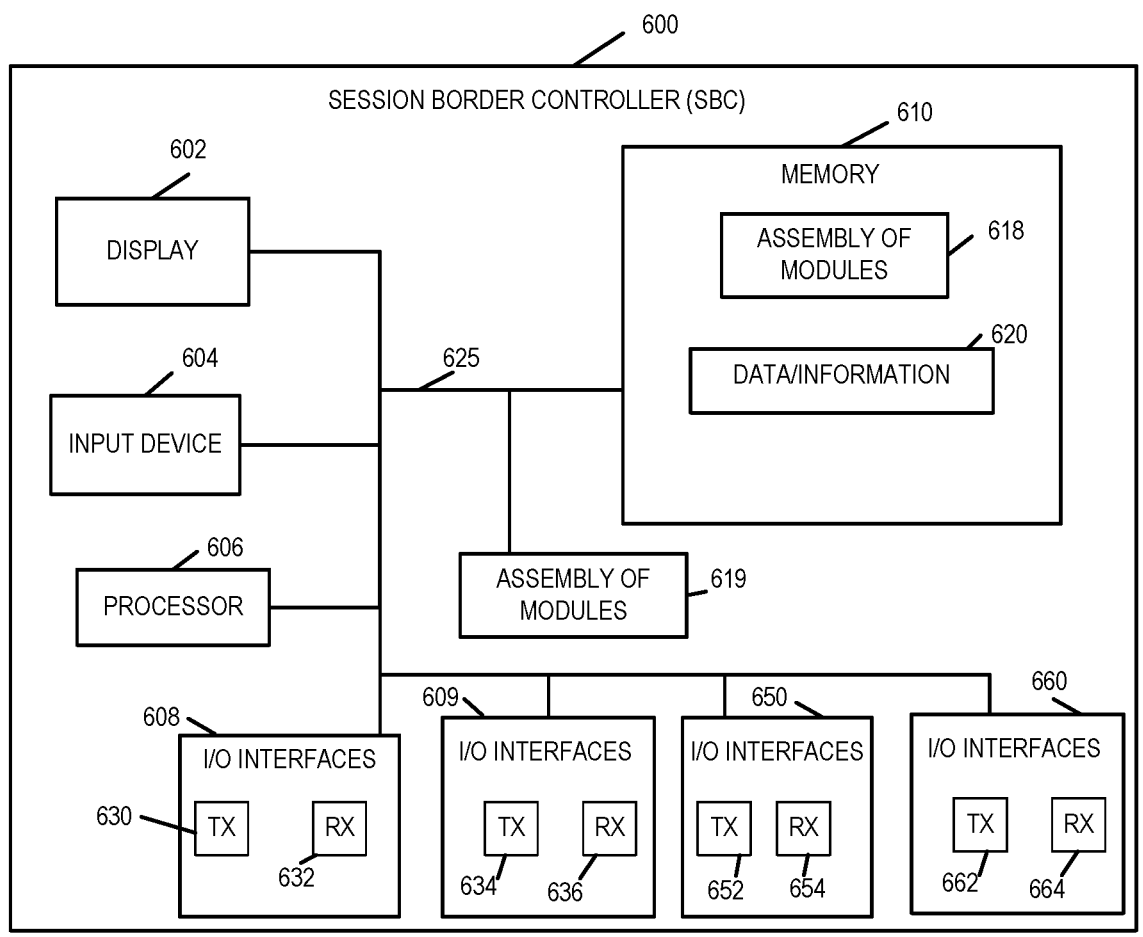
FIG. 6 illustrates an exemplary session border controller in accordance with an embodiment of the present invention.

The Session Border Controller 330 illustrated in FIGS. 3, 4 and 5 may be, and in some embodiments is implemented as device 600 of FIG. 6. FIG. 6 illustrates an exemplary embodiment of a device 600 which in this example is a Session Border Controller (SBC) in accordance with one embodiment of the present invention. The device 600 anchors media for media sessions. Exemplary SBC 600 includes a display 602, an input device 604, a processor 606, e.g., a CPU, input/output (I/O) interfaces 608, 609, 650, 660, which couple the SBC to networks and/or various other devices including for example TURN servers 314 and 316 and Network Address Translation devices 308 and 312; memory 610, and an assembly of modules 619, e.g., circuits corresponding to different modules, coupled together via a bus 625 over which the various elements may exchange data and information. Memory 610 includes an assembly of modules 618, e.g., an assembly of software modules, data/information 620. The I/O interfaces 608 include transmitters 630 and receivers 632. The I/O interfaces 609 include transmitters 634 and receivers 636. The I/O interfaces 650 include transmitters 652 and receivers 654. The I/O interfaces 660 include transmitters 662 and receivers 664. The device 600 is also configured to have a plurality of Internet Protocol (IP) address/port number pairs, e.g., logical IP address/port pairs, for use in exchanging signaling information, e.g., SIP signaling messages for establishing media sessions, and media, e.g., Real-time Transport Protocol packets of a media session. In some embodiments, a single public IP address/port pair is used for all signaling, e.g., SIP signaling relating to establishing sessions. In some embodiments, the SBC 600 does not include a display. In some embodiments, the SBC 600 is used in the method embodiments illustrated in FIGS. 10 and 11.

The I/O interfaces and transmitters and receivers included therein in some embodiments are configured to communicate in accordance with the Internet Protocol, Transport Control Protocol (TCP), User Datagram Protocol (UDP), Session Initiation Protocol (SIP), and Session Description Protocol (SDP). In some embodiments, the SBC 600 includes a communication module configured to operate using one or more IP, TCP, UDP, SIP, and SDP. In some embodiments, the communication module is a hardware module, a software module or a module including hardware and software components.

Figure 8:
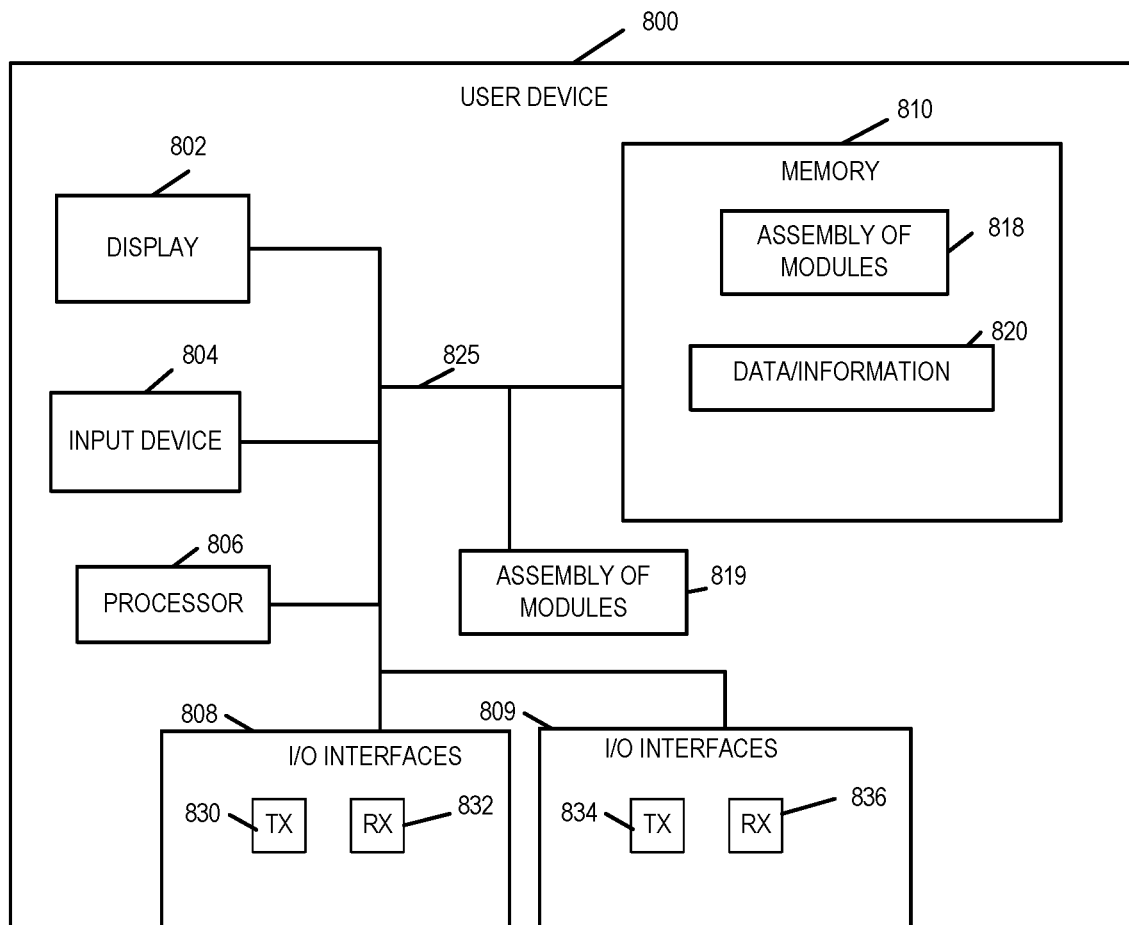
FIG. 8 illustrates an exemplary communications device, e.g., user device, in accordance with an embodiment of the present invention.

The UE 1 302 and UE 2 360 of system 300 of FIG. 3 may be, and in some embodiments are, implemented in accordance with the user equipment device 800 illustrated in FIG. 8. FIG. 8 illustrates an exemplary embodiment of a user device 800 which is in accordance with one embodiment of the present invention. The user device 800 is a communications device which is used for communicating data, e.g., media. Some exemplary user devices include Internet Protocol telephones, computers, and mobile devices such as for example, cellphones, mobile phones, smartphones, laptops, and tablets. Exemplary user device 800 includes a display 802, an input device 804, a processor 806, e.g., a CPU, input/output (I/O) interfaces 808 and 809, which couple the user device to networks and/or various other devices including for example Network Address Translation device 304 and SBC 330; memory 810, and an assembly of modules 819, e.g., circuits corresponding to different modules, coupled together via a bus 825 over which the various elements may exchange data and information. Memory 810 includes an assembly of modules 818, e.g., an assembly of software modules, data/information 820. The I/O interfaces 808 include transmitters 830 and receivers 832. The I/O interfaces 809 include transmitters 834 and receivers 836. The device 800 is also configured to have a plurality of Internet Protocol (IP) address/port number pairs, e.g., logical IP address/port pairs, for use in exchanging signaling information, e.g., SIP signaling messages for establishing media sessions, and media, e.g., Real-time Transport Protocol packets of a media session.

The I/O interfaces and transmitters and receivers included in the device 800 in some embodiments are configured to communicate in accordance with the Internet Protocol, Transport Control Protocol (TCP), User Datagram Protocol (UDP), Session Initiation Protocol (SIP), and Session Description Protocol (SDP). In some embodiments, the user device 800 includes a communication module configured to operate using one or more IP, TCP, UDP, SIP, and SDP. In some embodiments, the communication module is a hardware module, a software module or a module including hardware and software components. In some embodiments, user devices 302 and 360 of FIGS. 3, 4, and 5 are implemented in accordance with user device 800 of FIG. 8. The user devices of the methods described in connection with FIGS. 10 and 11 may also be implemented in accordance with the user device 800 of FIG. 8.

FIG. 4 illustrates an exemplary signaling diagram/method 400 in accordance with one embodiment of the present invention which reduces and/or eliminates the data loss or clipping problem described above. For explanatory purposes the method 400 has been implemented on system 300.

For explanatory purposes simplified request and response messages are depicted with the messages and information contained therein illustrated which are most pertinent to explaining the exemplary method embodiment 400. As it will be appreciated additional information and formatting of the messages as well as the use of additional messages may be and typically is used in initiating and communicating among devices in networks. For explanatory purposes, the messages exchanged between the UE 302, SBC 330 and UE 2 360 of system 300 are shown however it will be understood by those of skill in the art that additional message exchanges occur as messages traverse the NATs and/or TURN servers in the system 300.

The method 400 begins in start step 402. Operation proceeds from step 402 to step 404. In step 404, the UE 1 302 in response to a user input detected at the UE 1 302 to establish a data session with UE 2 360, collects and/or determines one or more candidate transport addresses that are a potential point of contact for receipt of media at UE 1 302. A transport address being the combination of an Internet Protocol (IP) address and transport protocol (e.g., UDP or TCP) port. UE 1 302 candidate IP address/port pairs are collected and/or determined in accordance with the ICE protocol procedures. The candidate addresses may, and in some embodiments do, include one or more of the following candidate addresses: host candidate, server reflexive candidate, peer reflexive candidate, and relayed candidate addresses. Operation proceeds from step 404 to step 406. In step 406, UE 1 302 generates Session Initiation Protocol (SIP) Invite message 410 to establish a data session, e.g., RTP media session, with UE 2 360. The data session may be, and in some embodiments is, an audio data session for a VOIP call. The SIP Invite message 410 includes a SDP offer message 412 including the following ICE attributes: Candidate-1: M, Candidate-2:N, Username-A, Password-A. The candidate-1: M attribute identifies a first candidate source IP address and port number pair upon which the recipient should perform connectivity checks for establishing a data session with UE 1 302. M representing the first transport address which includes a first candidate IP address and port number pair. The ICE attribute candidate-2: N identifies a second candidate source IP address and port number upon which the recipient may perform connectivity checks for establishing a data session with UE 1 302. The attribute username: A identifies the username for UE 1 302 and the attribute password-A identifies the password for UE 1 302. The username and password are used to provide integrity protection/authentication for STUN messages exchanged during the connectivity checks of the ICE procedure. Operation proceeds from step 406 to step 408.

In step 408, UE 1 302 transmits SIP Invite message 410 to SBC 330. Operation proceeds from step 408 to step 414. In step 414, SBC 330 receives via one of the receivers of its I/O interfaces, the SIP Invite message 410. Operation proceeds from step 414 to step 416. In step 416, SBC 330 generates SIP Invite message 420. SIP Invite message 420 includes SDP offer message 422. SDP offer message 422 includes the following ICE attributes: Candidate-1: SBC-M-Proxy; Candidate-2: SBC-N-Proxy; Username-S, Password-S. The Candidate-1: SBC-M-Proxy attribute identifies a first candidate source IP address and port number pair upon which the recipient should perform connectivity checks for establishing a data session with SBC 330. SBC-M-Proxy representing the first transport address which includes a first candidate IP address and port number pair. The SBC-M-Proxy is a proxy address which the SBC associates with UE 1 302 address M. The SBC-M-Proxy transport candidate address is a unique public IP address port pair of the SBC which as explained the SBC associates with UE 1 302 address M. The ICE attribute Candidate-2: SBC-N-PROXY identifies a second candidate source IP address and port number upon which the recipient may perform connectivity checks for establishing a data session with SBC 330. The SBC-N-Proxy transport candidate address is a unique public IP address port pair of the SBC which the SBC associates with UE 1 302 address N. In some embodiments, the IP address for the SBC-M-Proxy candidate and the SBC-N-Proxy candidate are the same but the ports are different so that the IP address/port pair is unique. The attribute username-S identifies the username for SBC 330 and the attribute password-S identifies the password for SBC 330. The username and password are used to provide integrity protection/authentication for STUN messages exchanged between SBC 330 and UE 2 360 during the connectivity checks of the ICE procedure. Operation proceeds from step 416 to step 418.

In step 418, SBC 330 transmits via a transmitter of one of its I/O interfaces the SIP Invite message 420 to UE 2 360. Operation proceeds from step 418 to step 424. In step 424, UE 2 360 receives SIP Invite message 420. Operation proceeds from step 424 to step 426.

In step 426, UE 2 360 processes the SIP Invite 420 message and in response to the SDP offer 422 collects and/or determines one or more candidate transport addresses that are a potential point of contact for receipt of media at UE 2 360. Operation proceeds from step 426 to step 427.

In step 427, UE 2 360 generates SIP 18X response message 430. The SIP 18X response message 430 includes SDP answer message 432 which includes the following ICE attributes: Candidate-1: O, Candidate-2:P, Username-B, Password-B. The candidate-1: O attribute identifies a first candidate source IP address and port number pair upon which the recipient should perform connectivity checks for establishing a data session with UE 2 360. O representing the first transport address which includes a first candidate IP address and port number pair. The ICE attribute candidate-2: P identifies a second candidate source IP address and port number upon which the recipient may perform connectivity checks for establishing a data session with UE 2 360. The attribute username: B identifies the username for UE 2 360 and the attribute password-B identifies the password for UE 2 360. The username and password are used to provide integrity protection/authentication for STUN messages exchanged during the connectivity checks of the ICE procedure. Operation proceeds from step 427 to step 428.

In step 428, UE 2 360 transmits SIP 18X response message 430 to SBC 330 via one of its I/O interface transmitters in response to SIP Invite message 420. Operation proceeds from step 428 to step 434.

In step 434 SBC 330 received via one of its I/O interface receivers the SIP 18X response message 430. Operation proceeds from step 434 to step 436.

In step 436, SBC 330 generates SIP 18X response message 440 in response to the SIP Invite message 410. The SIP 18X response message 440 includes SDP answer message 442 which is the answer to SDP offer message 412. The SDP answer message 442 includes the following ICE attributes: Candidate-1: SBC-O-Proxy, Candidate-2: SBC-P-Proxy, Username-T, Password-T. The Candidate-1: SBC-O-Proxy attribute identifies a first candidate source IP address and port number pair upon which the recipient should perform connectivity checks for establishing a data session with SBC 330. SBC-O-Proxy representing the first transport address which includes a first candidate IP address and port number pair. The SBC-O-Proxy is a proxy address which the SBC associates with UE 2 360 address O. The SBC-O-Proxy transport candidate address is a unique public IP address port pair of the SBC 330 which as explained the SBC associates with UE 2 360 address O. The ICE attribute Candidate-2: SBC-P-Proxy identifies a second candidate source IP address and port number upon which the recipient may perform connectivity checks for establishing a data session with SBC 330. The SBC-P-Proxy transport candidate address is a unique public IP address port pair of the SBC which the SBC associates with UE 2 360 address P. In some embodiments, the IP address for the SBC-O-Proxy candidate and the SBC-P-Proxy candidate are the same but the ports are different so that the IP address/port pair is unique. The attribute username-T identifies the username for SBC 330 and the attribute password-T identifies the password for SBC 330. The username and password are used to provide integrity protection/authentication for STUN messages exchanged between SBC 330 and UE 1 302 during the connectivity checks of the ICE procedure. Operation proceeds from step 436 to step 438.

In step 438, SBC 330 transmits via one of its I/O interface transmitters the SIP 18X response message 440 to the UE 1 302 in response to the SIP Invite message 410. Operation proceeds from step 438 to step 444.

In step 444, UE 1 302 receives via one of its I/O interface receivers, the SIP 18X response message 440. Operation proceeds from step 444 to step 446.

In step 446, UE 1 302 acting as the ICE controller for the media session to be established generates a set of candidate transport address combinations for UE 1 302 and SBC 330 for the leg of the media session to be established between UE 1 302 and the SBC 330 based on the UE 1 302 candidate transport addresses included in SDP offer message 410 and SBC 330 candidate transport addresses included in the SDP answer message 440. The set of candidate transport address combinations in this example include: (M, SBC-O-Proxy), (M, SBC-P-Proxy), (N, SBC-O-Proxy), and (N, SBC-P-Proxy). Operation proceeds from step 446 to step 447.

In step 447, UE 1 302 generates a STUN connectivity check message 450 to be used to perform a connectivity check on the first candidate transport address pair combination (M, SBC-O-Proxy). The STUN connectivity check message 450 includes UE 1 302 source transport address M and SBC 330 destination transport address SBC-O-Proxy. Operation proceeds from step 447 to step 448.

In step 448, UE 1 302 transmits STUN connectivity check message 450 from I/O transmitter with transport address M to SBC 330 I/O receiver transport address SBC-O-Proxy. Operation proceeds from step 448 to step 454.

In step 454, SBC 330 receives the STUN message 450 at its I/O receiver with the transport address assigned to SBC-O-Proxy. Operation proceeds from step 454 to step 455.

In step 455, upon receipt of the STUN connectivity check message 450 at the SBC-O-Proxy transport address, the SBC 330 determines that the message is associated with and/or corresponds to a message destined for UE-2 transport address O. Operation proceeds from step 455 to step 456.

In step 456, SBC 330 generates STUN connectivity check message 460 with SBC 330 source transport address SBC-M-Proxy and UE 2 360 destination transport address O. Operation proceeds from step 456 to step 458.

In step 458, SBC 330 transmits via its I/O interface transmitter with transport address SBC-M-Proxy STUN connectivity check message 460 to UE 2 360. Operation proceeds from step 458 to step 464.

In step 464, UE 2 360 successfully receives the STUN connectivity check message 460 at an I/O receiver with the transport address O. Operation proceeds from step 464 to step 466.

In step 466, UE 2 360 generates STUN connectivity check response message 470 in response to receiving STUN connectivity check message 460 with UE-2 360 source transport address O and SBC 330 destination transport address SBC-M-Proxy. Operation proceeds from step 466 to step 468.

In step 468, UE 2 360 transmits via its I/O interface transmitter with transport address O STUN connectivity check response message 470 to SBC 330 transport address SBC-M-Proxy. Operation proceeds from step 468 to step 474.

In step 474, SBC 330 receives the STUN check response message 470 at an I/O receiver with the transport address SBC-M-Proxy. The connectivity check on the SBC-M-Proxy, O address pair has been successfully completed. Operation proceeds from step 474 to step 475.

In step 475, SBC 330 determines that the STUN connectivity checks for the candidate transport addresses (SBC-M-Proxy, O) for the second leg of the media session to be established between UE 1 302 and UE 2 360, that is the leg of the media session between SBC 330 and UE 2 360. SBC 330 identifies and/or selects the UE 1 302 candidate transport address associated with and/or corresponding to SBC-M-Proxy at which the STUN connectivity message 470 was received as UE 1 302 candidate transport address M. Operation proceeds from step 475 to step 476.

In step 476, in response to receiving the STUN connectivity check message 470 which indicates that the connectivity check has been successful for the candidate transport address combination (SBC-M-Proxy, O), the SBC 330 generates STUN connectivity response message 480 which responds to STUN connectivity check message 480. The STUN connectivity check response message 480 in response to receiving STUN connectivity check message 450 with SBC 330 source transport address SBC-O-Proxy and destination transport address M. Operation proceeds from step 476 to step 478.

In step 478, SBC 330 transmits via its I/O interface transmitter with transport address SBC-O-Proxy, STUN connectivity check response message 480 to UE 1 302 transport address M. Operation proceeds from step 478 to step 484.

In step 484, UE 1 302 receives the STUN check response message 480 at an I/O receiver with the transport address M. Operation proceeds from step 484 to step 486.

In step 486 UE 1 302, which is the controlling ICE agent for the leg of the call between UE 1 302 and SBC 330, determines/selects to use the (M, SBC-O-Proxy) transport address pair combination for the data session. When regular nomination of selected candidate addresses is used. The UE 1 302 transmits another STUN message from address M of the UE 1 302 to the SBC 300 address SBC-O-Proxy including information, e.g., a set flag, indicating the selection of the (M, SBC-O-Proxy) addresses as the candidate address pair combination selected for the data session. Upon receipt by the SBC 330 of the STUN message with the information indicating the selection of the (M, SBC-O-Proxy) address pair combination, the SBC 330 selects the candidate address pair (SBC-M-Proxy, O) for the data session between SBC 330 and UE 2 360 and sends a STUN message from address SBC-M-Proxy, O) to UE 2 360 address O. This STUN message includes information, e.g., a set flag, indicating the selection of (SBC-M-Proxy, O) addresses as the candidate address pair combination selected for the data session between SBC 330 and UE 2 360. This STUN request message activates the data session between UE 2 360 and the SBC 330 for UE 2 360 upon receipt. The UE 2 360 responds to this STUN request message with a STUN response message to SBC 330 which upon receipt by SBC 330 activates the data session for SBC 360 between SBC 330 and UE 2 360. Upon receipt of this STUN response message from UE 2 360, SBC 330 transmits a STUN response message from SBC-O-Proxy address to UE 1 302 transport address M. Upon receipt of this STUN response message, the data session between UE 302 and SBC 330 is activated. Operation proceeds from step 486 to step 488. In step 488, UE 1 302 begins transmitting session data, e.g., media such as audio in the form of an RTP packet stream, to SBC 330 transport address SBC-O-Proxy. In step 488, session data message 490 is transmitted from UE 1 302 I/O receiver with transport address M to transport address SBC-O-Proxy. The session data message includes source transport address M and destination transport address SBC-O-Proxy. Operation proceeds from step 488 to step 492.

In step 492, SBC 330 at I/O receiver with transport address SBC-O-Proxy receives the session data message 490. Operation proceeds from step 492 to step 492.

In step 494, SBC 330 can relay the session data it receives as the SBC STUN connectivity checks to UE 2 360 has been successfully concluded on the leg of the data session between SBC 330 and UE 2 360 for the transport address combination of (SBC-M-Proxy, O). SBC 330 is the controlled ICE agent for the leg of the data session from UE 1 302 to SBC 330 and the controlling ICE agent for the leg of the data session from SBC 330 to UE 2 360. As the controlling agent for the leg of the data session between SBC 330 and UE 2 360, SBC 330 determines that the transport combination (SBC-M-Proxy, O) will be used for the data session based on determination made by UE 1 302. Operation proceeds from step 494 to step 495.

In step 495, SBC 330 generates session data message 497 based on the session data message 490 as part of the relaying process. Session data message 495 includes a source transport address of SBC-M-Proxy and destination transport address of O. The session data message 497 also includes data from session data message 490. Operation proceeds from step 495 to step 496.

In step 496, SBC 330 transmits from I/O interface transmitter with transport address SBC-M-Proxy the session data message 497 to UE 2 360 transport address O. Operation proceeds from step 496 to step 498.

In step 498, UE 2 360 receives at I/O interface receiver with transport address O the session data message 497. It should be noted that no data clipping or loss of session data transmitted by UE 1 302 to the SBC 330 has occurred as the connectivity checks for the second leg of the data session between the SBC 330 and the UE 2 360 were concluded for the corresponding candidate transport address combination prior to the SBC 330 responding to the UE 1 302 connectivity check for corresponding first candidate transport address combination (M, SBC-O-Proxy).

In this example, the controlling ICE agent UE 1 302 which initiated the SIP Invite with the initial SDP offer message decided that once a successful candidate transport address combination connectivity check had been completed the remaining candidate transport address pairs were not needed to be tested but the successful candidate transport address combination would be used for the data session.

In some embodiments, all candidate transport address combinations are tested and UE 1 302 then makes the determination as to which of the successful candidate transport address combinations will be utilized for the data session. In such cases, the SBC 330 acts as a proxy and only responds to STUN connectivity checks on the first leg of the data session between UE 1 302 and SBC 330 when the corresponding STUN connectivity checks are completed on the second leg of the data session between SBC 330 and UE 2 360. In this way, data clipping of data sent from UE 1 302 to the UE 2 360 is eliminated and/or reduced. It will be appreciated that when the SBC 330 does not receive a response to a STUN connectivity check message it transmitted, the SBC 330 will make the determination that the candidate transport address combination connectivity check failed and will then refrain from sending a STUN response to the transport address to which the SBC proxy transport address corresponds. For example, if after a predetermined amount of time no response is received by the SBC 330 to the STUN connectivity check message 460 sent to UE 2 360, SBC 330 would make the determination that the transport address combination (SBC-M-Proxy, O) connectivity check has failed and would refrain from sending response 480 to UE 1 302. In this way, when UE 1 302 does not receive a response it will send a connectivity check for the next candidate transport pair combination (M, SBC-P-Proxy). It should be noted that the predetermined amount of time before a connectivity check is considered to fail is greater than the amount of time required for SBC 330 to perform connectivity connects on the candidate addresses for the second leg of the call between the SBC 330 and the UE 2 360.

In some embodiments, both the controlled agent and the controlling agent perform connectivity checks on the candidate address pair combinations. For example, UE 1 302 the controlling agent and SBC 330 the controlled agent for the leg of the data session between UE 1 302 and SBC 330 each perform connectivity checks on the transport address pair combination (M, SBC-O-Proxy). The connectivity check for SBC-O-Proxy performed by the SBC 330 may be a triggered connectivity check that is performed at the time that SBC 330 receives a STUN request from UE 1 302 from address M on port SBC-O-Proxy. In this way a four way handshake is completed.

Signaling diagram 5000 of FIG. 5 illustrates another exemplary method of the present invention. The method 5000, may be and in some embodiments is, implemented on system 300. For explanatory purposes simplified request and response messages are depicted with the messages and information contained therein illustrated which are most pertinent to explaining the exemplary method embodiment 5000. As it will be appreciated additional information and formatting of the messages as well as the use of additional messages may be and typically is used in initiating and communicating among devices in networks. For explanatory purposes, the messages exchanged between the UE 302, SBC 330 and UE 2 360 of system 300 are shown however it will be understood by those of skill in the art that additionally message exchanges occur as messages traverse the NATs and/or TURN servers in the system 300. In the exemplary method 5000, the SBC 330 uses a single candidate transport address for each leg of the data session that has a routable IP address in the corresponding IP network. In this example, the SBC 330 transport address SBC-IP-1 includes a routable IP address in the IP network in which UE 2 360 is located and the SBC 330 transport address SBC-IP-2 includes a routable IP address in the IP network in which UE 1 302 is located. While the SBC 330 uses a single routable IP address as a candidate transport address for UE 2 360, it sends multiple STUN packets to perform multiple connectivity tests in parallel thereby reducing the amount of time it takes to identify a successful candidate transport address for UE 2 360.

The method 5000 begins in start step S002. Operation proceeds from step S002 to step S004. In step S004, the UE 302 in response to a user input detected at the UE 1 302 to establish a data session with UE 2 360, collects and/or determines one or more candidate transport addresses that are a potential point of contact for receipt of media at UE 1 302. A transport address being the combination of an Internet Protocol (IP) address and transport protocol (e.g., UDP or TCP) port. UE 1 302 candidate IP address/port pairs are collected and/or determined in accordance with the ICE protocol procedures. The candidate addresses may, and in some embodiments do, include one or more of the following candidate addresses: host candidate, server reflexive candidate, peer reflexive candidate, and relayed candidate addresses. Operation proceeds from step S004 to step S006.

In step S006, UE 1 302 generates Session Initiation Protocol (SIP) Invite message 5010 to establish a data session, e.g., RTP media session, with UE 2 360. The data session may be, and in some embodiments is, an audio data session for a VOIP call. The SIP Invite message 5010 includes a SDP offer message 5012 including the following ICE attributes: Candidate-1: M, Candidate-2:N, Username-A, Password-A. The candidate-1: M attribute identifies a first candidate source IP address and port number pair upon which the recipient should perform connectivity checks for establishing a data session with UE 1 302. M representing the first transport address which includes a first candidate IP address and port number pair. The ICE attribute candidate-2: N identifies a second candidate source IP address and port number upon which the recipient may perform connectivity checks for establishing a data session with UE 1 302. The attribute username: A identifies the username for UE 1 102 and the attribute password-A identifies the password for UE 1 302. The username and password are used to provide integrity protection/authentication for STUN messages exchanged during the connectivity checks of the ICE procedure. Operation proceeds from step S006 to step S008.

In step S008, UE 1 302 transmits SIP Invite message 5010 to SBC 330. Operation proceeds from step S008 to step S014. In step S014, SBC 330 receives via one of the receivers of its I/O interfaces, the SIP Invite message 5010. Operation proceeds from step S014 to step S016. In step S016, SBC 330 generates SIP Invite message 5020. SIP Invite message 5020 includes SDP offer message 5022. SDP offer message 5022 includes the following ICE attributes: Candidate-1: SBC-IP-1, Username-S, Password-S. The Candidate-1: SBC-IP-1 attribute identifies a first candidate source IP address and port number pair upon which the recipient should perform connectivity checks for establishing a data session with SBC 330. SBC-IP-1 representing the first transport address which includes a first candidate IP address and port number pair. The SBC-IP-1 transport candidate address is a unique public IP address port pair of the SBC. The attribute username-S identifies the username for SBC 330 and the attribute password-S identifies the password for SBC 330. The username and password are used to provide integrity protection/authentication for STUN messages exchanged between SBC 330 and UE 2 360 during the connectivity checks of the ICE procedure. Only a single candidate address port pair SBC-IP-1 is provided because the IP address port pair is a public IP address port pair and as such the IP address port pair is reachable by entities on the Internet. Unlike in the exemplary method 400, the SBC 330 is not acting as a proxy and therefore only needs to provide a single SBC-IP-1 candidate address to the UE 2 360 though multiple candidate addresses could be provided. Operation proceeds from step S016 to step S018.

In step S018, SBC 330 transmits via a transmitter of one of its I/O interfaces the SIP Invite message 5020 to UE 2 360. Operation proceeds from step S018 to step S024. In step S024, UE 2 360 receives SIP Invite message 5020 by one of its I/O interface receivers. Operation proceeds from step S024 to step S026.

In step S026, UE 2 360 processes the SIP Invite 5020 message and in response to the SDP offer 5022 collects and/or determines one or more candidate transport addresses that are a potential point of contact for receipt of media at UE 2 360. Operation proceeds from step S026 to step S027.

In step S027, UE 2 360 generates SIP 18X response message 5030. The SIP 18X response message 5030 includes SDP answer message 5032 which includes the following ICE attributes: Candidate-1: O, Candidate-2:P, Username-B, Password-B. The candidate-1: O attribute identifies a first candidate source IP address and port number pair upon which the recipient should perform connectivity checks for establishing a data session with UE 2 360. O representing the first transport address which includes a first candidate IP address and port number pair. The ICE attribute candidate-2: P identifies a second candidate source IP address and port number upon which the recipient may perform connectivity checks for establishing a data session with UE 2 360. The attribute username: B identifies the username for UE 2 360 and the attribute password-B identifies the password for UE 2 360. The username and password are used to provide integrity protection/authentication for STUN messages exchanged during the connectivity checks of the ICE procedure. Operation proceeds from step S027 to step S028.

In step S028, UE 2 360 transmits SIP 18X response message 5030 to SBC 330 via one of its I/O interface transmitters in response to SIP Invite message 5020. Operation proceeds from step S028 to step S034.

In step S034 SBC 330 received via one of its I/O interface receivers the SIP 18X response message 5030. Operation proceeds from step S034 to step S036.

In step S036, SBC 330 generates SIP 18X response message 5040 in response to the SIP Invite message 5010. The SIP 18X response message 5040 includes SDP answer message 5042 which is the answer to SDP offer message 5012. The SDP answer message 5042 include the following ICE attributes: Candidate-1: SBC-IP-2, Username-T, Password-T. The Candidate-1: SBC-IP-2 attribute identifies a first candidate source IP address and port number pair upon which the recipient should perform connectivity checks for establishing a data session with SBC 330. SBC-IP-2 representing the first transport address which includes a first candidate IP address and port number pair. Only a single candidate transport address is needed for the SBC as the SBC is not using proxy candidate addresses as done in the method 400 and the transport address is public and routable. The attribute username-T identifies the username for SBC 330 and the attribute password-T identifies the password for SBC 330. The username and password are used to provide integrity protection/authentication for STUN messages exchanged between SBC 330 and UE 1 302 during the connectivity checks of the ICE procedure. Operation proceeds from step S036 to step S038.

In step S038, SBC 330 transmits via one of its I/O interface transmitters the SIP 18X response message 5040 to the UE 1 302 in response to the SIP Invite message 5010. Operation proceeds from step S038 to step S044.

In step S044, UE 1 302 receives via one of its I/O interface receivers, the SIP 18X response message 5040. Operation proceeds from step S044 to step S046.

In step S046, UE 1 302 acting as the ICE controller for the media session to be established generates a set of candidate transport address combinations for UE 1 302 and SBC 330 for the leg of the media session to be established between UE 1 302 and the SBC 330 based on the UE 1 302 candidate transport addresses included in SDP offer message 5010 and SBC 330 candidate transport addresses included in the SDP answer message 5040. The set of candidate transport address combinations in this example include: (M, SBC-IP-2) and (N, SBC-IP-2). The set of candidate transport addresses may, and in some embodiments is prioritized. Operation proceeds from step S046 to step S047.

In step S047, UE 1 302 generates a STUN connectivity check message 5050 to perform a connectivity check on the first candidate transport address pair combination (M, SBC-IP-2). The STUN connectivity check message includes UE 1 302 source transport address M and SBC 330 destination transport address SBC-IP-2. Operation proceeds from step S047 to step S048.

In step S048, UE 1 302 transmits STUN connectivity check message 5050 from I/O transmitter with transport address M to SBC 330 I/O receiver transport address SBC-IP-2. Operation proceeds from step S048 to step S054.

In step S054, SBC 330 receives the STUN message 5050 at its I/O receiver with the transport address assigned to SBC-IP-2. Operation proceeds from step S054 to step S055. In step S055, SBC 330 which is the controlling ICE agent in the SBC 330 to UE 2 360 leg of the data session generates a list of the candidate transport address combinations to be tested for the leg of the data session between SBC 330 controlling agent and UE 2 360 the ICE controlled agent.

The list of candidate transport address combination include (SBC-IP-1, O) and (SBC-IP-1, P). Operation proceeds from step S055 to step S056.

In step S056, SBC 330 generates connectivity check messages 5060 and 5070 which will be used to perform connectivity checks on the first and second candidate transport address combinations. STUN connectivity check message 5060 includes SBC 330 source candidate transport address SBC-IP-1 and UE 2 360 destination transport address O. STUN connectivity check message 5070 includes SBC 330 source candidate transport address SBC-IP-1 and UE 2 360 destination transport address P. Operation proceeds from step S056 to step S058.

In step S058, SBC 330 transmits via its I/O interface transmitter with transport address SBC-IP-1 STUN connectivity check message 5060 to UE 2 360. Operation proceeds from step S058 to step S068.

In step S068, SBC 330, SBC 330 transmits via its I/O interface transmitter with transport address SBC-IP-1 STUN connectivity check message 5070 to UE 2 360. Operation proceeds from step S068 to step S064.

While step S058 is discussed as occurring before step S068, the order in which these steps is performed is not critical. What is important is that multiple candidate transport address combinations are carried out in parallel as opposed to sequentially. In this way, the process of identifying one or more successful candidate transport address combinations that may be used for the leg of the data session between SBC 330 and UE 2 360 is accelerated saving time as opposed to performing one connectivity check at a time.

In step S064, UE 2 360 successfully receives the STUN connectivity check message 5060 at an I/O receiver with the transport address O. Operation proceeds from step S064 to step S066.

In step S066, UE 2 360 generates STUN connectivity check response message 5080 in response to receiving STUN connectivity check message 5060 with UE-2 360 source transport address O and SBC 330 destination transport address SBC-IP-1. Operation proceeds from step S066 to step S074.

In step S074, UE 2 360 successfully receives the STUN connectivity check message 5070 at an I/O receiver with the transport address P. Operation proceeds from step S074 to step S078.

In step S078, UE 2 360 transmits via its I/O interface transmitter with transport address O STUN connectivity check response message 5080 to SBC 330 transport address SBC-IP-1. Operation proceeds from step S078 to step S084.

In step S084, SBC 330 receives the STUN check response message 5080 at an I/O receiver with the transport address SBC-IP-1. Operation proceeds from step S084 to step S086.

At this time, SBC 330 has successfully completed a connectivity check with respect to candidate address combination (SBC-IP-1, O) but the connectivity check being performed on the candidate address combination (SBC-IP-1, P) has not completed. In step S086, SBC 330 makes a determination as to whether to wait for a reply to the additional STUN connectivity check request message 5070 sent to UE 2 360 or upon receipt of the response to the STUN response message 5060 which indicated the successful completion of the STUN connectivity check on the candidate transport address combination (SBC-IP-1, O) to proceed with a response to the STUN (M, SBC-IP-2) connectivity check message 5050. In this example, SBC 330 determines to respond to the STUN message 5050 upon the receipt of the first reply to its multiple STUN messages 5060 and 5070 transmitted to UE 2 360 in steps S058 and S068 and not to wait for all replies. Operation proceeds from step S086 to step S087.

In step S087, the SBC 330 generates STUN connectivity response message 5090 which responds to STUN connectivity check message 5050. The STUN connectivity check response message 5090 responds to STUN connectivity check message 5050 and includes SBC 330 source transport address SBC-IP-2 and destination transport address M. Operation proceeds from step S087 to step S088.

In step S088, SBC 330 transmits via its I/O interface transmitter with transport address SBC-IP-2, STUN connectivity check response message 5090 to UE 1 302 transport address M. Operation proceeds from step S088 to step S094.

In step S094, UE 1 302 receives the STUN check response message 5090 at an I/O receiver with the transport address M. Operation proceeds from step S090 to step S096.

In step S096, UE 1 302 makes a decision as to whether to use the first candidate transport address combination (M, SBC-IP-2) which has now completed successfully for the data session or to also test the other candidate transport addresses on the generated list before deciding which candidate transport address combination to use for the data session. In this example, the UE 1 302 which is the controlling ICE agent for the first leg of the data session between UE 1 302 and SBC 330 determines to use the (M, SBC-IP-2) transport address combination for the data session and to start sending session data. Operation proceeds from step S096 to step S097.

In step S097, UE 1 302 generates session data message 5100. Operation proceeds from step S097 to step S098.

In step S098, UE 1 302 begins transmitting session data, e.g., media such as audio in the form of an RTP packet stream, to SBC 330 transport address SBC-IP-2. In step S098, session data message 5100 is transmitted from UE 1 302 I/O receiver with transport address M to transport address SBC-IP-2. The session data message includes source transport address M and destination transport address SBC-IP-2. Operation proceeds from step S098 to step S104.

In step S104, SBC 330 at I/O receiver with transport address SBC-IP-2 receives the session data message 5100. Operation proceeds from step S104 to step S106.

In step S106, SBC 330 can relay the session data it receives as the SBC STUN connectivity checks to UE 2 360 has been successfully concluded on the leg of the data session between SBC 330 and UE 2 360 for the transport address combination of (SBC-IP-1, O). SBC 330 is the controlled ICE agent for the leg of the data session from UE 1 302 to SBC 330 and the controlling ICE agent for the leg of the data session from SBC 330 to UE 2 360. As the controlling agent for the leg of the data session between SBC 330 and UE 2 360, SBC 330 determines that the transport address combination (SBC-IP-1, O) will be used for the data session. Operation proceeds from step S106 to step S107.

In step S107, SBC 330 generates session data message 5110 based on the session data message 5100 as part of the relaying process. Session data message 5110 includes a source transport address of SBC-IP-1 and destination transport address of O. The session data message 5110 also includes data from session data message 5100. Operation proceeds from step S107 to step S108.

In step S108, SBC 330 transmits from I/O interface transmitter with transport address SBC-IP-1 the session data message 5110 to UE 2 360 transport address O. Operation proceeds from step S108 to step S114.

In step S114, UE 2 360 receives at I/O interface receiver with transport address O the session data message 5110. It should be noted that no data clipping or loss of session data has occurred as the connectivity checks for the second leg of the data session between the SBC 330 and the UE 2 360 were concluded for the corresponding candidate transport address combination (SBC-IP-1, O) prior to the SBC 330 responding to the UE 1 302 connectivity check for candidate transport address combination (M, SBC-IP-2).

In this example, the controlling ICE agent UE 1 302 which initiated the SIP Invite with the initial SDP offer message decided that once a successfully candidate transport address combination connectivity check had been completed the remaining candidate transport address pairs were not needed to be tested but the successful candidate transport address combination would be used for the data session. In some embodiments, both the controlled agent and the controlling agent perform connectivity checks on the candidate address pair combinations. In this way a four way handshake is completed. Exemplary embodiments in which connectivity checks are performed by both the controlled and controlling agent include those in which aggressive nomination is employed.

Figure 10A:
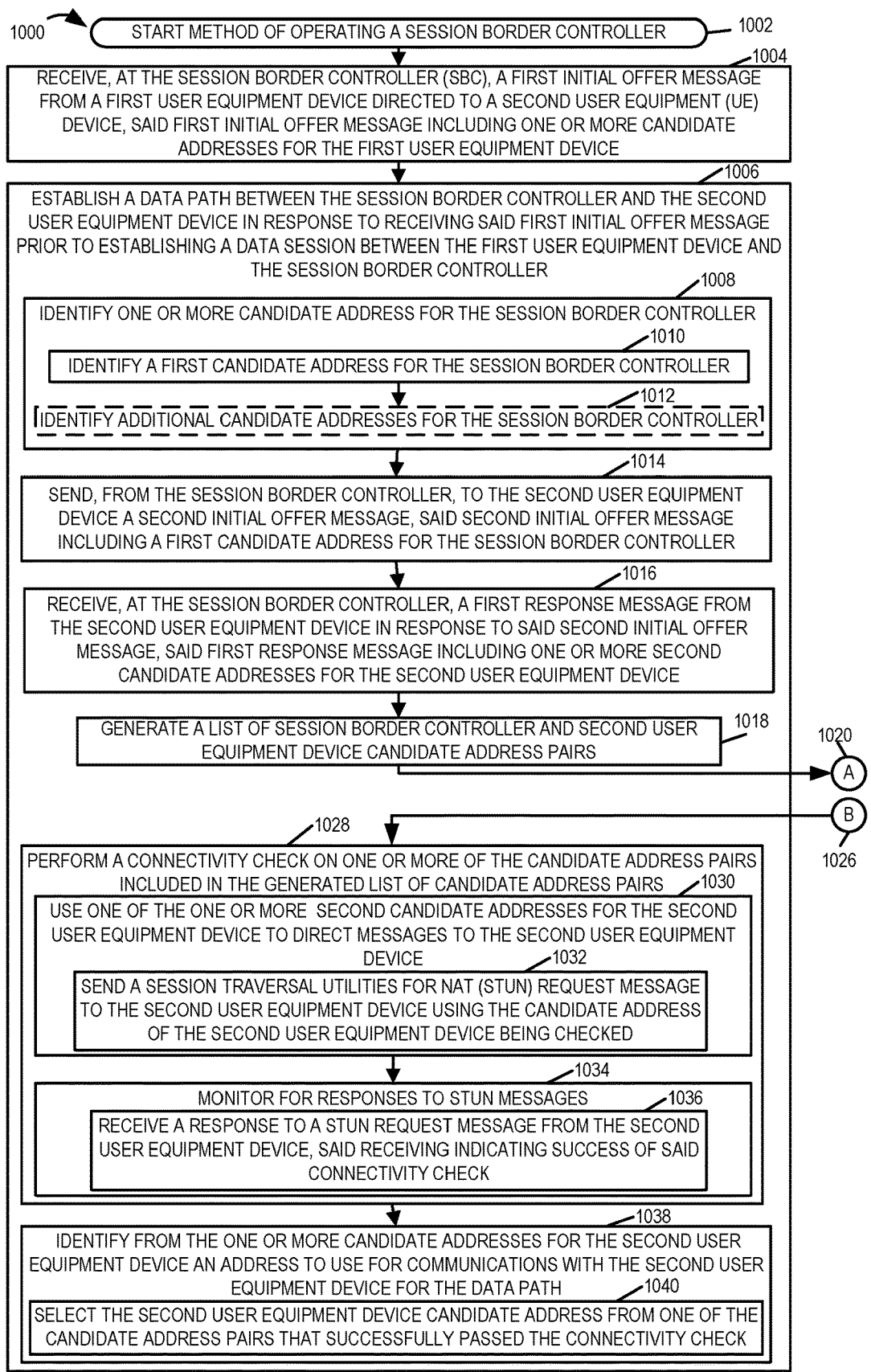
FIG. 10A illustrates a first part of an exemplary method in accordance with an embodiment of the present invention.

Another exemplary method embodiment of the invention will now be discussed in connection with FIG. 10. FIG. 10, comprising the combination of FIG. 10A and FIG. 10B, is a flowchart 1000 of an exemplary method of operating a session border controller (SBC) in accordance with various exemplary embodiments. Operation starts in step 1002 in which the session border controller is powered on and initialized. Operation proceeds from step 1002 to step 1004. In step 1004 the session border controller receives a first initial offer message from a first user equipment (UE) device directed to a second user equipment device, said first initial offer message including one or more candidate addresses for the first user equipment device. In some embodiments, the session border controller operates as an Interactive Connectivity Establishment (ICE) protocol controlled agent in relation to the first user equipment device and as an Interactive Connectivity Establishment protocol controlling user agent in relation to the second user equipment device. In various embodiments, the first initial offer message is a SIP INVITE message including a Session Description Protocol message including the one or more candidate addresses for the first user equipment device. In some embodiments, the first initial offer message traverses a Network Address Translator (NAT) device prior to being received by the session border controller. Operation proceeds from step 1004 to step 1006.

In step 1006, the session border controller establishes a data path between the session border controller and the second user equipment in response to receiving said first initial offer message prior to establishing a data session between the first user equipment device and said session border controller. Step 1006 includes steps 1008, 1014, 1016, 1018, 1028, and 1038. In step 1008 the session border controller identifies one or more candidate addresses for the session border controller. Step 1008 includes step 1010 and, in some embodiments, includes step 1012. In step 1010 the session border controller identifies a first candidate address for the session border controller. In some embodiments, the second user equipment device is located within a network and the first candidate address for the session border controller is a routable address in the network in which the second user equipment device is located. In step 1012 the session border controller identifies one or more additional candidate addresses for the session border controller. Operation proceeds from step 1008 to step 1014.

In step 1014, the session border controller sends a second initial offer message to the second user equipment device, said second initial offer message including the first candidate address for the session border controller. The second initial offer message may also include the additional candidate addresses for the session border controller. Operation proceeds from step 1014 to step 1016.

In step 1016 the session border controller receives a first response message from the second user equipment device in response to said second initial offer message, said first response message including one or more second candidate addresses for the second user equipment device. Operation proceeds from step 1016 to step 1018.

In step 1018 the session border controller generates a list of session border controller and second user equipment device candidate address pairs. Operation proceeds from step 1018, via connecting node A 1020, to step 1022.

In step 1022, the session border controller sends to the first user equipment device an answer message in response to the first initial offer message and prior to completing establishing the data path between the session border controller and the second user equipment device, said answer message including a candidate address for the session border controller. In some embodiments, the session border controller operates as an Interactive Connectivity Establishment (ICE) protocol controlled agent in relation to the first user equipment device and as an Interactive Connectivity Establishment protocol controlling user agent in relation to the second user equipment device. In some embodiments, the answer message is a SIP 18X message including a Session Description Protocol message, said Session Description Protocol message including the session border controller candidate address, said candidate address being routable in the network in which the first user equipment device is located. The first user equipment and second user equipment device are located in different networks, and therefore the first and second user equipment devices do not know each others addresses. Operation proceeds from step 1022 to step 1024. In step 1024 the session border controller receives at least one session traversal utilities for NAT (STUN) request message from the first user equipment device. Operation proceeds from step 1024, via connecting node B 1026, to step 1028 shown on FIG. 10A. Step 1028 includes steps 1030 and 1034.

In step 1028 the session border controller performs a connectivity check on one or more of the candidate address pairs included in the generated list of candidate address pairs. Step 1028 includes step 1030, in which the session border controller uses one of the one or more second candidate addresses for the second user equipment device to direct messages to second user equipment device. Step 1030 includes step 1032, in which the session border controller sends a session traversal utilities for NAT (STUN) request message to the second user equipment device using the candidate address of the second user equipment device being checked. Steps 1030 and 1032 may be, and sometimes are, repeated multiple times, e.g., each iteration corresponding to a different candidate address pair on the list of generated candidate address pairs.

Operation proceeds from step 1030 to step 1034. In step 1034, the session border controller monitors for response to stun messages, e.g., a response from the second user equipment device to one of the STUN request message(s) sent in step 1032. Step 1034 includes step 1036, in which the session border controller receives a response to a STUN request message from the second user equipment device, said receiving indicating success of said connectivity check. In some embodiments, step 1036 may be, and sometimes is, repeated multiple times, e.g., corresponding to success of multiple different connectivity checks. Operation proceeds from step 1034 to step 1038.

In step 1038 the session border controller identifies from the one or more candidate addresses for the second user equipment device an address to use for communications with second user equipment device for the data path. Step 1038 includes step 1040 in which the session border controller selects the second user equipment device candidate address from one of the candidate address pairs that successfully passed the connectivity check.

In some embodiments, the connectivity checks are performed for each of the candidate address pairs in parallel. In some such embodiments, the first candidate address pair to pass the connectivity check is selected as the pair of addresses to use for the data path between the session border controller and the second user equipment device.

Operation proceeds from step 1038, via connection node C 1042, to step 1044 shown on FIG. 10B. In step 1044 the session border controller sends to one of the one or more candidate addresses for the first user equipment device a response to a connectivity check message for the first user equipment device after establishing the data path between the session border controller and the second user equipment device. Operation proceeds from step 1044 to step 1046.

In step 1046 the session border controller establishes a data session between the session border controller and the first user equipment device using a candidate address for the first user equipment device selected by the first user equipment device. Operation proceeds from step 1046 to step 1048. In step 1048 the session border controller receives data from the first user equipment device and relays said received data to the second user equipment device over the data path established between the session border controller and the second user equipment device.

In some embodiments, the session border controller activates the established data path between the session border controller and second user equipment device prior to establishing a data session between the first user equipment device and the session border controller. In some embodiments, the session border controller activates the data path between the session border controller and second user equipment device prior to sending a response to one, some or all connectivity check messages received from the first user equipment device.

Another exemplary method embodiment of the invention will now be discussed in connection with FIG. 11. FIG. 11, comprising the combination of FIG. 11A, FIG. 11B, FIG. 11C, FIG. 11D, FIG. 11E, and FIG. 11F is a flowchart 1100 of an exemplary method of operating a session border controller (SBC) in accordance with various exemplary embodiments. Operation starts in step 1102 in which the session border controller is powered on and initialized. Operation proceeds from start step 1102 to step 1104.

In step 1104, the SBC receives a first initial offer message from a first user equipment device (UE 1) directed to a second user equipment device (UE 2), the first initial offer message including one or more candidate addresses for the first user equipment device (e.g., UE 1 candidate addresses M, N wherein the candidate addresses M and N represent transport addresses. Each transport address including an IP address and port number. The first initial offer message may be, and in some embodiments is, a SIP Invite message including a SDP offer message including ICE candidate addresses for establishing a data/media session. Operation proceeds from step 1104 to decision step 1106.

In decision step 1106, the SBC determines whether to operate in a STUN proxying mode of operation or a STUN multiplying mode of operation in connection with establishing a data session between UE 1 and UE 2. The data session having two legs a first leg between UE 1 and the SBC and a second leg between the SBC and UE 2. The SBC anchoring the data/media of the session and operating in a back to back user agent mode. In this example, the UE 1 assumes the ICE controlling agent role and the SBC the ICE controlled agent role for the first leg and the SBC assumes the ICE controlling agent role while UE 2 is in the ICE controlled agent role for the second leg. Step 1106 includes sub-steps 1108 and 1110.

In sub-step 1108, the mode of operation determined to be used is the stun proxying mode of operation. Operation proceeds from sub-step 1108 to step 1114.

In sub-step 1110, the stun multiplying mode of operation is the determined mode of operation to use. Operation proceeds from step 1110 to step 1202 illustrated on FIG. 11F via connection node A 1112.

In some embodiments, the determination of the mode of operation is configurable as part of the initiation process and occurs before the first initial offer message is received. In some embodiments, only one mode of operation is supported by the device instead of both modes of operation. In some embodiments, the mode of operation is determined based on network congestion factors and/or the number of candidate addresses for which connectivity tests possibly need to be performed. In some embodiments, the mode of operation is determined based on a service level agreement regarding the level and/or type of service to be provided to UE 1 and/or UE 2.

In step 1202, the SBC sends a second initial offer message from the SBC to the UE 2, the second initial offer message including a first routable candidate transport address for the SBC. The second initial offer message may be, and in some embodiments is, a SIP Invite message to establish a data session between the SBC and UE 2 including a SBC Offer message including information about the data session to be established and including the SBC first routable candidate address to be used for a data path for the data session. Operation proceeds from step 1202 to step 1204.

In step 1204, the SBC receives from the UE 2 a response message to the second initial offer message. The response message includes one or more second candidate addresses for UE 2. The response message may be, and in some embodiments is, a SIP 18X message include a SDP answer message including information about the data session to be established including the second candidate addresses for UE 2. The second candidate addresses are transport addresses. Operation proceeds from step 1204 to step 1206.

In step 1206, the SBC sends a response message to the first initial offer message to UE 1. This response message includes a second routable transport candidate address for the SBC. Operation proceeds from step 1206 to step 1208.

In step 1208, the SBC receives one or more connectivity check messages from one or more of the UE 1 first candidate addresses. The connectivity check message are typically STUN request messages. The SBC refrains from responding to the received connectivity check messages until connectivity checks for at least one data path between the SBC and UE 2 has been completed successfully. Operation proceeds from step 1208 to step 1210.

In step 1210, the SBC generates and sends in parallel a connectivity check message to a plurality of the UE 2 second candidate address messages. Operation proceeds from step 1210 to step 1212.

In step 1212, upon the first receipt of a response message to the plurality of connectivity check messages sent to the UE 2 second candidate addresses by the SBC, the SBC sends a response message to at least one of the one or more connectivity check messages received from UE 1 acknowledging receipt of the connectivity check message being responded to. Operation proceeds from step 1212 to step 1214.

In step 1214, the SBC cancels the connectivity checks for the remaining second candidate addresses and notifies UE 2 that the second candidate address from which the response message from UE 2 was received is the selected second candidate address that will be used for the data path between the SBC and UE 2 along with the first routable SBC candidate address. Operation proceeds from step 1214 to step 1216.

In step 1216, the SBC responds to any additional connectivity check messages received for the UE 1 first candidate addresses. Operation proceeds from step 1216 to step 1218.

In step 1218, the SBC receives from UE1 the identification of the UE 1 first candidate address and the second routable SBC address which has been selected to be used for the data session between UE 1 and the SBC. Operation proceeds from step 1218 to step 1220.

In step 1220, the SBC receives session data from the selected UE 1 first candidate address at the selected SBC routable candidate address and relays the session data via the selected SBC first routable candidate address to the selected second candidate address.

Returning now to when in the method the stun proxying mode of operation is the determined mode of operation. Operation proceeds from sub-step 1108 to step 1114.

In step 1114, the SBC establishes a data path between the SBC and the second user equipment device (UE 2) in response to receiving the first initial offer message prior to establishing a data session between the first user equipment device and the SBC. Step 1114 includes sub-steps 1116, 1118, 1120, 1122, 1124, 1126, 1130, 1132, 1142, 1154, 1164, 1174, 1184, 1190, 1192, and 1196.

In sub-step 1116, the SBC identifies a proxy candidate address for the SBC for each of the one or more candidate addresses for the first user equipment device included in the first initial offer message (e.g., SBC Proxy candidate address SBC-M-Proxy for UE 1 candidate address M and SBC Proxy candidate address SBC-N-Proxy for UE 1 candidate address N). Operation proceeds from sub-step 1116 to sub-step 1118.

In sub-step 1118, the SBC generates a second initial offer message, the second initial offer message including the identified proxy candidate address(es) for the SBC (e.g., SBC-Proxy-M, SBC-Proxy-N). In some embodiments, the second initial offer message is a SIP Invite message including a SDP offer message including information for the data session attempting to be established between the SBC and UE 2. The SDP offer message including the identified SBC Proxy candidate addresses. Operation proceeds from sub-step 1118 to sub-step 1120.

In sub-step 1120, the SBC sends to the UE 2 the second initial offer message. Operation proceeds from sub-step 1120 to sub-step 1122.

In sub-step 1122, the SBC receives a first response message from the second user equipment device in response to the second initial offer message. The first response message includes one or more second candidate addresses for the second user equipment device (e.g., UE 2 candidate transport addresses O, P). In some embodiments, the first response message is a SIP 18X message including a SDP answer message. The SDP answer message including the UE 2 candidate transport addresses O, P). Operation proceeds from sub-step 1122 to sub-step 1124.

In sub-step 1124, the SBC identifies an additional proxy candidate address for the SBC for each of the one or more candidate addresses for UE 2 included in the first response message (e.g., SBC Proxy candidate address SBC-O-Proxy for UE 2 candidate address O and SBC Proxy candidate address SBC-P-Proxy for UE 2 candidate address P). Operation proceeds from sub-step 1124 to sub-step 1126.

In sub-step 1126, the SBC generates a response message to the first initial offer message. The response message including the additional proxy candidate addresses identified for the SBC (e.g., SBC-Proxy-O, SBC-Proxy-P). In some embodiments, this response message to the first initial offer message is a SIP 18X message including a SDP answer message which includes the additional identified SBC Proxy addresses. Operation proceeds from sub-step 1126 via connection node B 1128 to sub-step 1130 illustrated on FIG. 11B.

In sub-step 1130, the SBC sends from the SBC to the UE 1 the response message to the first initial offer message. Operation proceeds from sub-step 1130 to sub-step 1132.

In sub-step 1132, the SBC receives one or more connectivity check messages from one or more of the first candidate addresses for the first user equipment device at one or more of the additional proxy candidate addresses of the SBC.

In some embodiments, the connectivity check messages used are STUN request messages.

In some embodiments, sub-step 1132 includes one or more of sub-steps 1134, 1136, 1138 and 1140.

In sub-step 1134, the SBC receives a connectivity check message from UE 1 first candidate address M at SBC proxy candidate address SBC-Proxy-O.

In sub-step 1136, the SBC receives a connectivity check message from UE 1 first candidate address M at SBC proxy candidate address SBC-Proxy-P.

In sub-step 1138, the SBC receives a connectivity check message from UE 1 first candidate address N at SBC proxy candidate address SBC-Proxy-O.

In sub-step 1140, the SBC receives a connectivity check message from UE 1 first candidate address N at SBC proxy candidate address SBC-Proxy-P.

Operation proceeds from sub-step 1132 to sub-step 1142.

In sub-step 1142, in response to receiving connectivity check message(s) from one or more first candidate addresses at one or more of the additional proxy candidate address for the SBC, the SBC sends a connectivity check message for each of the connectivity check messages received from the SBC proxy candidate address corresponding to the UE 1 first candidate address from which the message was received to the UE 2 second candidate address corresponding to the SBC proxy candidate address at which the message was received.

In some embodiments, sub-step 1142 includes sub-steps 1144, 1146, 1148, and 1150.

In sub-step 1144, in response to receiving a connectivity check message from UE 1 first candidate address M at SBC proxy candidate address SBC-Proxy-O, the SBC sends a connectivity check message from SBC proxy candidate address SBC-Proxy-M to UE 2 second candidate address O.

In sub-step 1146, in response to receiving a connectivity check message from UE 1 first candidate address M at SBC proxy candidate address SBC-Proxy-P, the SBC sends a connectivity check message from SBC proxy candidate address SBC-Proxy-M to UE 2 second candidate address P.

In sub-step 1148, in response to receiving a connectivity check message from UE 1 first candidate address N at SBC proxy candidate address SBC-Proxy-O, the SBC sends a connectivity check message from SBC proxy candidate address SBC-Proxy-N to UE 2 second candidate address O.

In sub-step 1150, in response to receiving a connectivity check message from UE 1 first candidate address N at SBC proxy candidate address SBC-Proxy-P, the SBC sends a connectivity check message from SBC proxy candidate address SBC-Proxy-N to UE 2 second candidate address P.

Figure 11A:
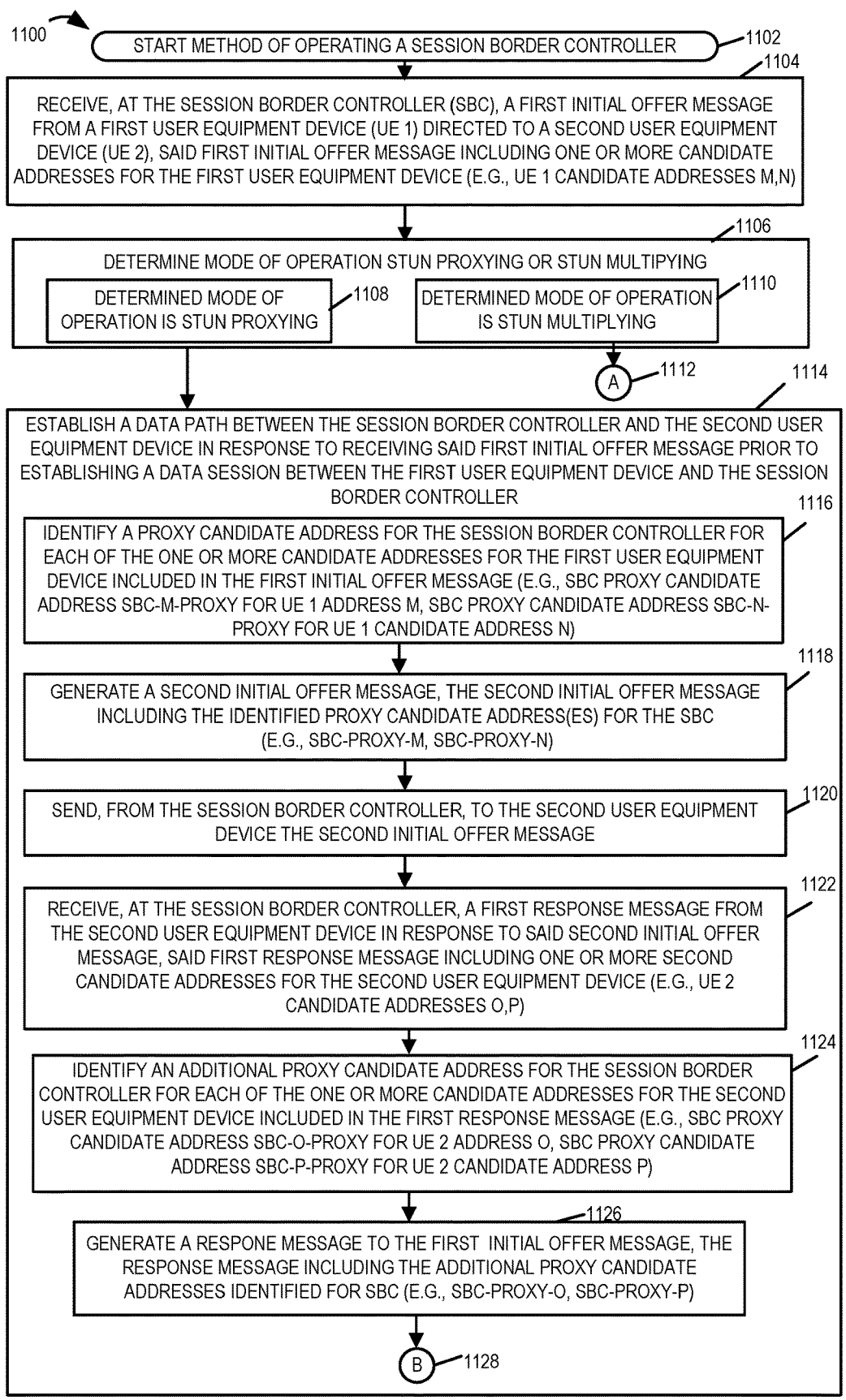
FIG. 11A illustrates a first part of another exemplary method embodiment of the present invention.
Figure 11B:
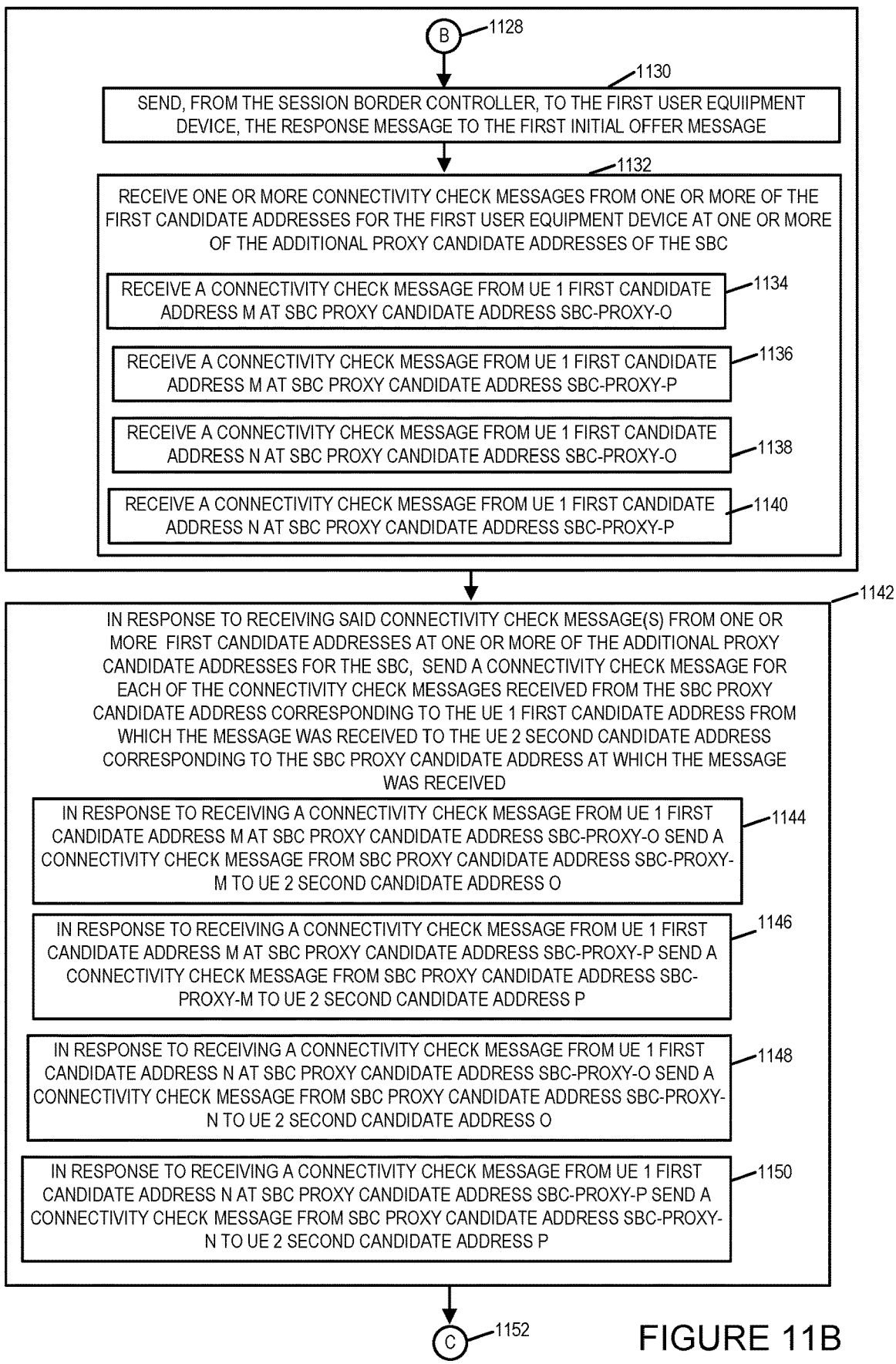
FIG. 11B illustrates a second part of another exemplary method embodiment of the present invention.
Figure 11C:
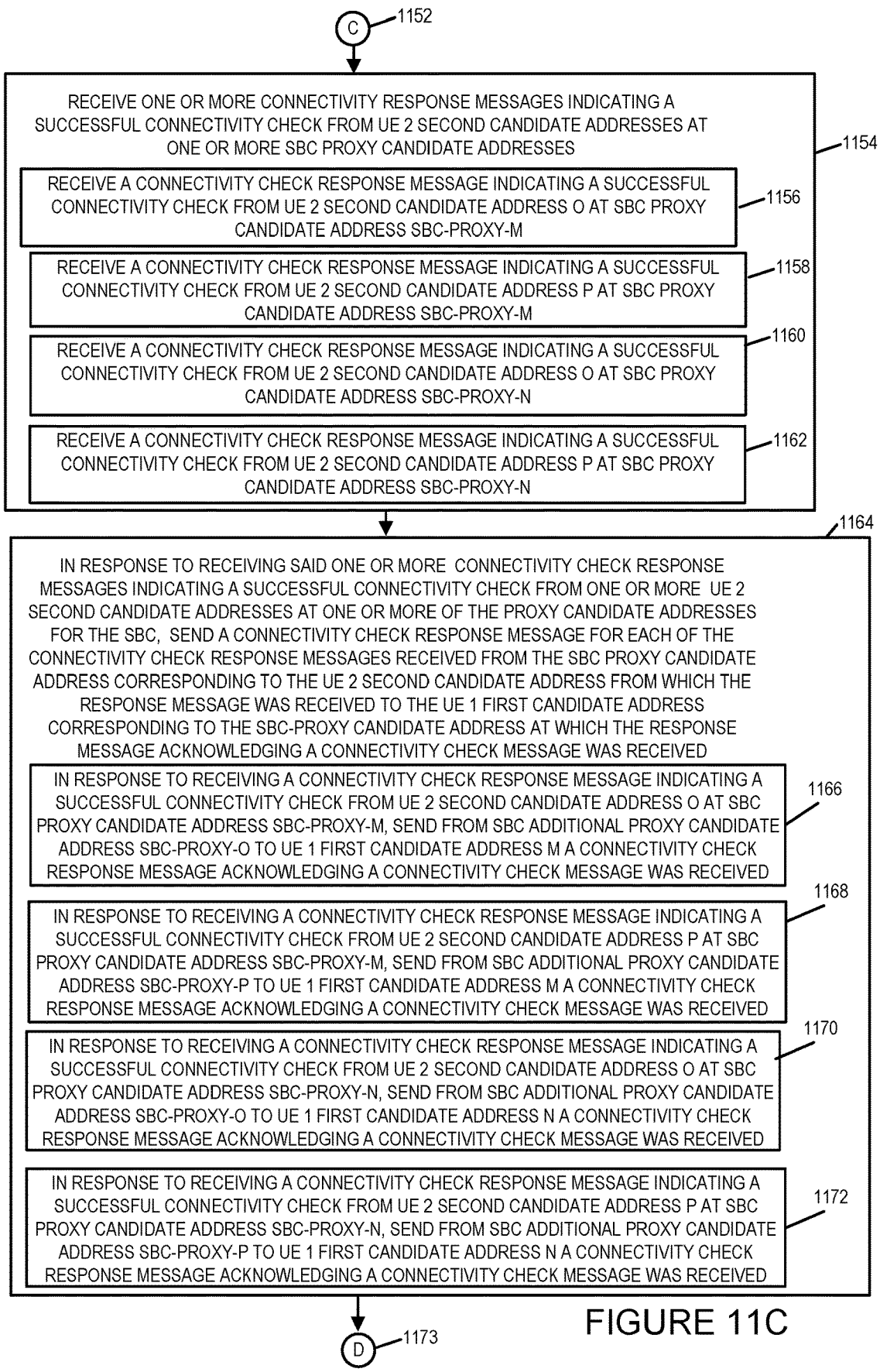
FIG. 11C illustrates a third part of another exemplary method embodiment of the present invention.

Operation proceeds from sub-step 1142 via connection node C 1152 to sub-step 1154 illustrated in FIG. 11C.

In sub-step 1154, the SBC receives one or more connectivity response messages indicating a successful connectivity check from UE 2 second candidate addresses at one or more SBC proxy candidate addresses. Sub-step 1154 in some embodiments includes one or more of sub-steps 1156, 1158, 1160 and 1162.

In some embodiments where the connectivity check messages are STUN requests, the connectivity check response message are STUN response messages.

In sub-step 1156, the SBC receives a connectivity check response message indicating a successful connectivity check from UE 2 second candidate address O at SBC Proxy candidate address SBC-Proxy-M.

In sub-step 1158, the SBC receives a connectivity check response message indicating a successful connectivity check from UE 2 second candidate address P at SBC Proxy candidate address SBC-Proxy-M.

In sub-step 1160, the SBC receives a connectivity check response message indicating a successful connectivity check from UE 2 second candidate address O at SBC Proxy candidate address SBC-Proxy-N.

In sub-step 1162, the SBC receives a connectivity check response message indicating a successful connectivity check from UE 2 second candidate address P at SBC Proxy candidate address SBC-Proxy-N.

Operation proceeds from sub-step 1154 to sub-step 1164.

In sub-step 1164, in response to receiving the one or more connectivity check response messages indicating a successful connectivity check from one or more UE 2 second candidate addresses at one or more of the proxy candidate addresses for the SBC, the SBC sends a connectivity check response message for each of the connectivity check response messages received from the SBC Proxy candidate address corresponding to the UE 2 second candidate address from which the response message was received to the UE 1 first candidate address corresponding to the SBC Proxy candidate address at which the response message indicating a successful connectivity check was received. In some embodiments, sub-step 1164 includes sub-steps 1166, 1168, 1170, and 1172. It should be noted that one or more of the connectivity checks may fail in which case no response message will be received from UE 2 in connection with that connectivity check.

In sub-step 1166, in response to receiving a connectivity check response message indicating a successful connectivity check from UE 2 second candidate address O at SBC Proxy candidate address SBC-Proxy-M, the SBC sends from SBC additional proxy candidate address SBC-Proxy-O to UE 1 first candidate address M a connectivity check response message acknowledging receipt by the SBC of the connectivity check message.

In sub-step 1168, in response to receiving a connectivity check response message indicating a successful connectivity check from UE 2 second candidate address P at SBC Proxy candidate address SBC-Proxy-M, the SBC sends from SBC additional proxy candidate address SBC-Proxy-P to UE 1 first candidate address M a connectivity check response message acknowledging receipt of the connectivity check message.

In sub-step 1170, in response to receiving a connectivity check response message indicating a successful connectivity check from UE 2 second candidate address O at SBC Proxy candidate address SBC-Proxy-N, the SBC sends from SBC additional proxy candidate address SBC-Proxy-O to UE 1 first candidate address N a connectivity check response message acknowledging receipt of the connectivity check message.

In sub-step 1172, in response to receiving a connectivity check response message indicating a successful connectivity check from UE 2 second candidate address P at SBC Proxy candidate address SBC-Proxy-N, the SBC sends from SBC additional proxy candidate address SBC-Proxy-P to UE 1 first candidate address N a connectivity check response message acknowledging receipt of the connectivity check message.

Figure 11D:
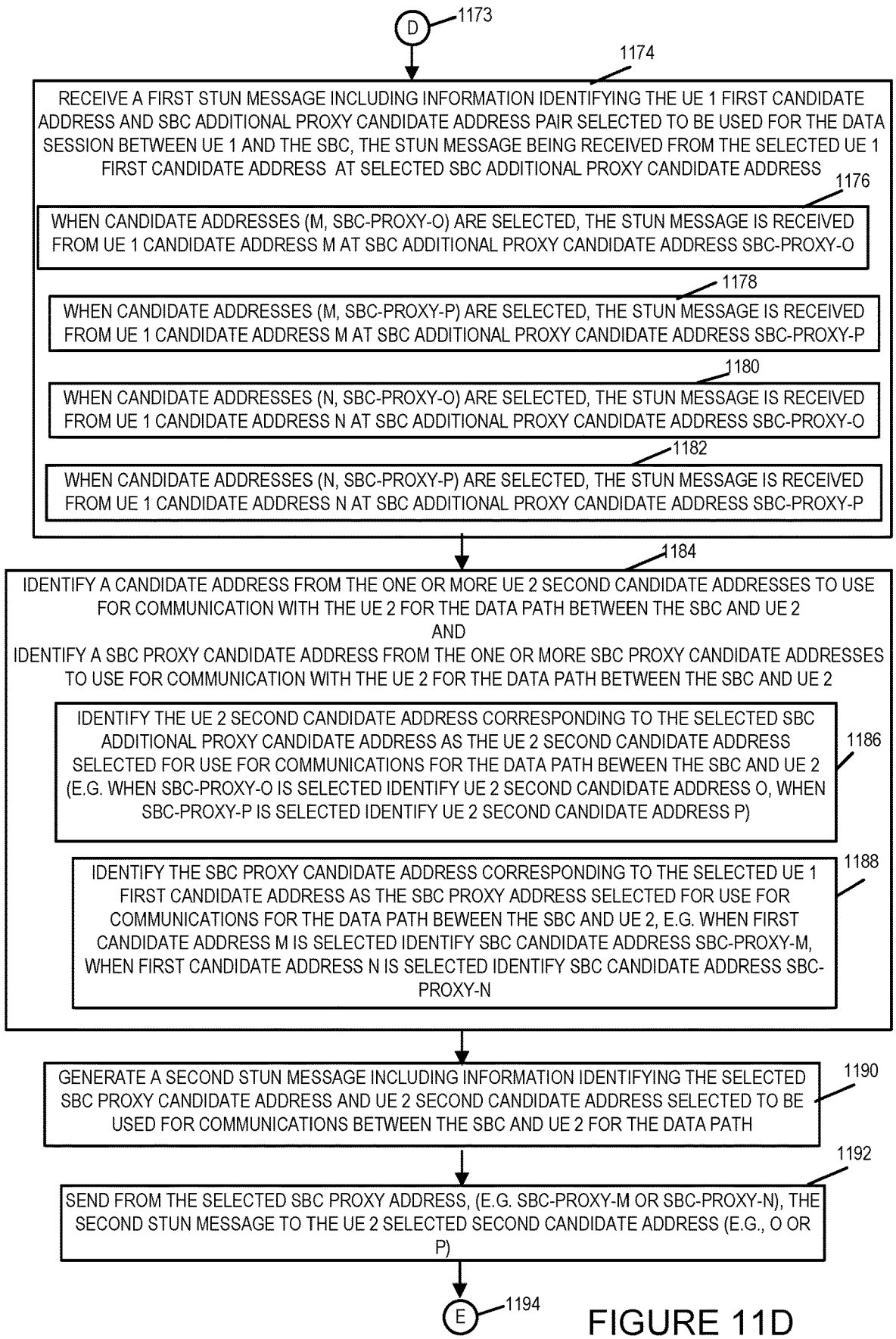
FIG. 11D illustrates a fourth part of another exemplary method embodiment of the present invention.
Figure 11E:
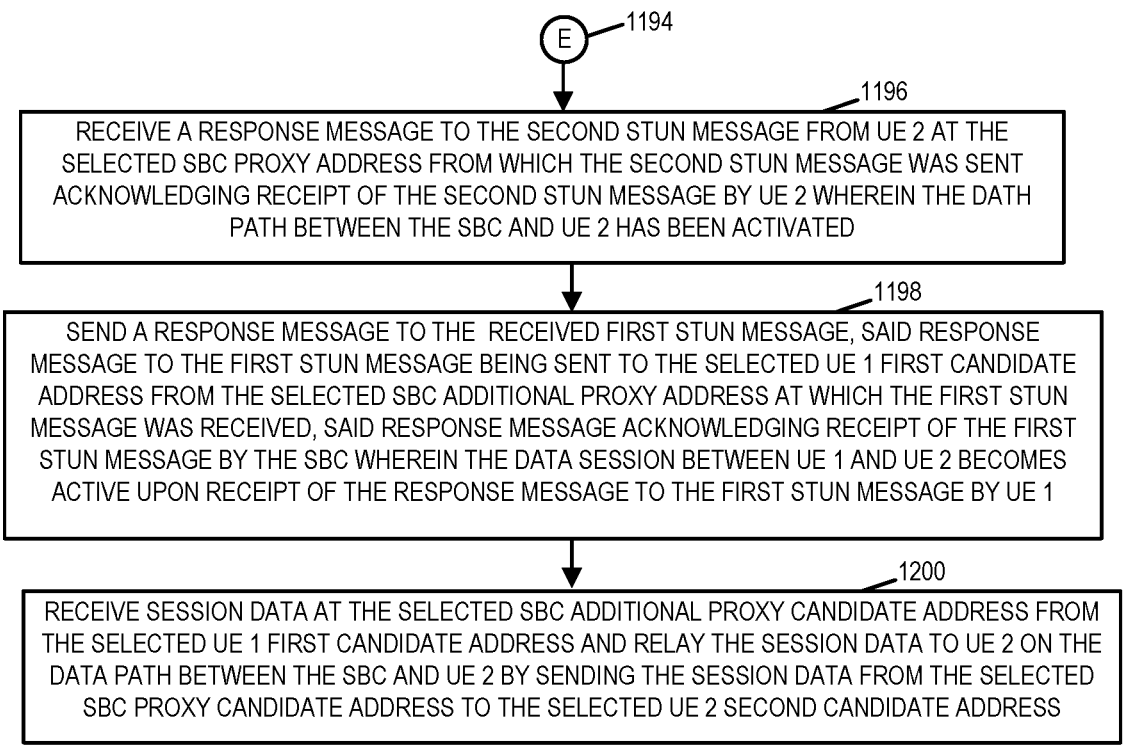
FIG. 11E illustrates a fifth part of another exemplary method embodiment of the present invention.
Figure 11:
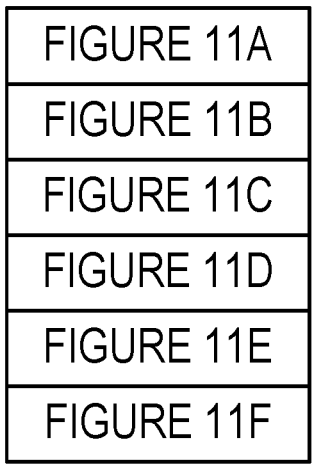
FIG. 11 illustration the combination of FIGS. 11A, 11B, 11C, 11D, 11E, and 11F.
Figure 11F:
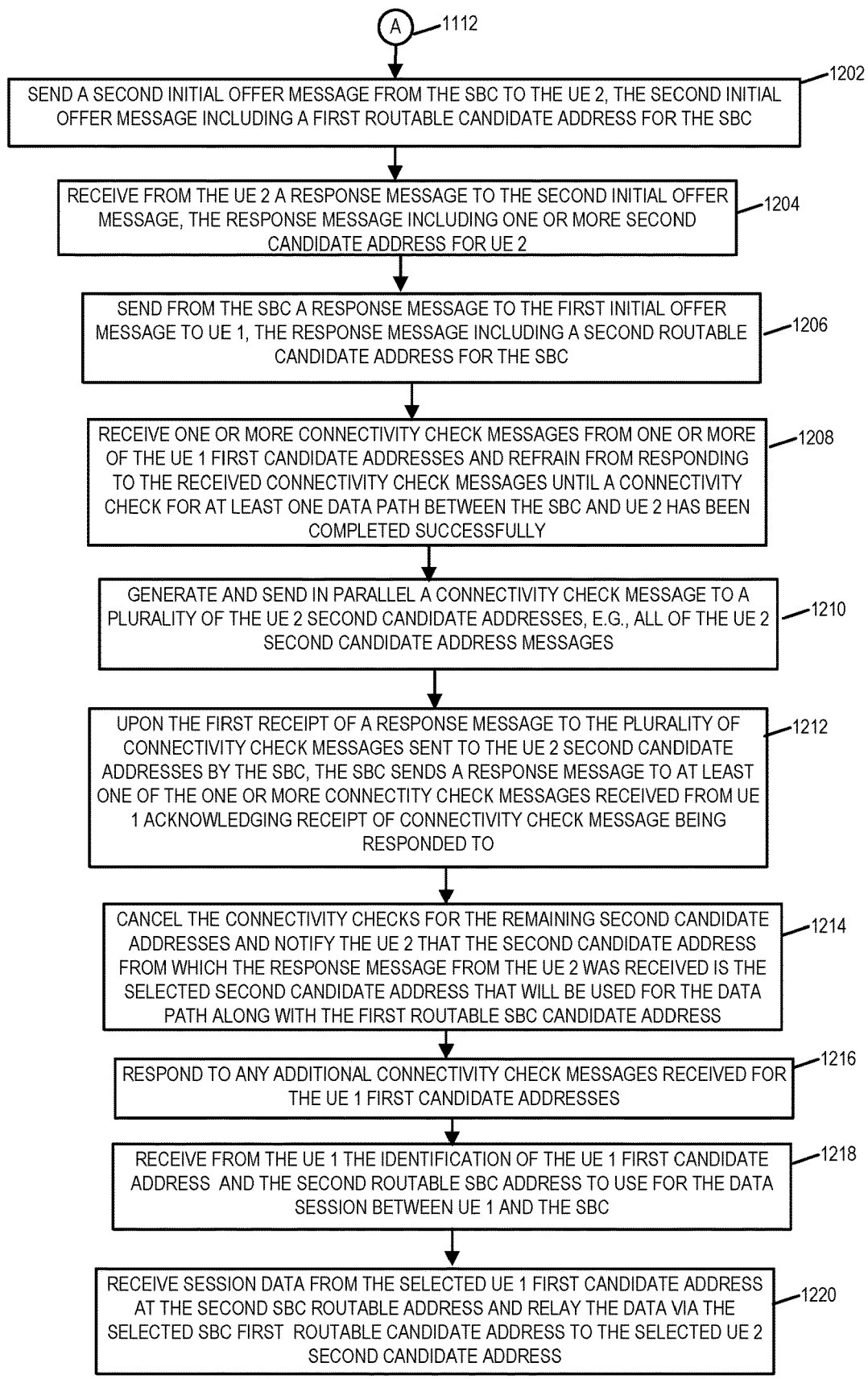
FIG. 11F illustrates a sixth part of another exemplary method embodiment of the present invention.

Operation proceeds from sub-step 1164 to sub-step 1174 illustrated on FIG. 11D via connection node D 1173.

In sub-step 1174, the SBC receives a first STUN message including information identifying the UE 1 first candidate address and SBC additional proxy candidate address pair selected to be used for the data session between UE 1 and the SBC by the UE 1 which is the ICE controlling agent for the data session being established between UE 1 and the SBC. The STUN message is received at the selected SBC additional proxy candidate address from the selected UE 1 first candidate address. In some embodiments, sub-step 1174 includes sub-steps 1176, 1178, 1180, 1182.

In sub-step 1176, when candidate addresses (M, SBC-Proxy-O) are selected, the STUN message is received from UE 1 candidate address M at SBC additional proxy candidate address SBC-Proxy-O.

In sub-step 1178, when candidate addresses (M, SBC-Proxy-P) are selected, the STUN message is received from UE 1 candidate address M at SBC additional proxy candidate address SBC-Proxy-P.

In sub-step 1180, when candidate addresses (N, SBC-Proxy-O) are selected, the STUN message is received from UE 1 candidate address N at SBC additional proxy candidate address SBC-Proxy-O.

In sub-step 1182, when candidate addresses (N, SBC-Proxy-P) are selected, the STUN message is received from UE 1 candidate address N at SBC additional proxy candidate address SBC-Proxy-P.

Operation proceeds from sub-step 1174 to step 1184.

In sub-step 1184, the SBC identifies a candidate address from the one or more UE 2 second candidate addresses to use for communication with the UE 2 for the data path between the SBC and UE 2. The SBC also identifies a SBC proxy candidate address from the one or more SBC proxy candidate addresses to use for communication with the UE 2 for the data path between the SBC and UE 2. In some embodiments, sub-step 1184 includes sub-steps 1186 and 1188.

In sub-step 1186, the SBC identifies the UE 2 second candidate address corresponding to the selected SBC additional proxy candidate address as the UE 2 second candidate address selected for use for communications for the data path between the SBC and UE 2 (e.g., when SBC-Proxy-O is selected, the SBC identifies UE 2 second candidate address O and when SBC-Proxy-P is selected, the SBC identifies UE 2 second candidate address P.

In sub-step 1188, the SBC identifies the SBC proxy candidate address corresponding to the selected UE 1 first candidate address as the SBC Proxy address selected for use for communications for the data path between the SBC and UE 2, e.g., when the first candidate address M is selected, the SBC identifies SBC candidate address SBC-Proxy-M and when the first candidate address N is selected, the SBC identifies SBC proxy candidate address SBC-Proxy-N.

Operation proceeds from step 1184 to step 1190.

In step 1190, the SBC generates a second STUN message including information identifying the selected SBC proxy candidate address and UE 2 second candidate address selected to be used for communications between the SBC and UE 2 for the data path. Operation proceeds from step 1190 to step 1192.

In step 1192, the SBC sends from the selected SBC proxy address (e.g., SBC-Proxy-M or SBC-Proxy-N), the second STUN message to the UE 2 selected second candidate address (e.g., O or P). Operation proceeds from step 1192 to step 1196 shown on FIG. 11E via connection node E 1194.

In step 1196, the SBC receives a response message to the second STUN message form UE 2 at the selected SBC proxy address from which the second STUN message was sent acknowledging receipt of the second STUN message by UE 2 wherein the data path between the SBC and UE 2 has been activated. Operation proceeds from step 1196 to step 1198.

In step 1198, the SBC sends a response message to the received first STUN message. The response message to the first STUN message is sent to the selected UE 1 first candidate address from the selected SBC additional Proxy address at which the first STUN message was received. The response message acknowledging receipt of the first STUN message by the SBC wherein the data session between UE 1 and UE 2 becomes active for UE 1 upon receipt of the response message to the first STUN message by UE 1. Operation proceeds from step 1198 to step 1200.

In step 1200, the SBC receives session data at the selected SBC additional proxy candidate address from the selected UE 1 first candidate address and relays the session data to UE 2 on the data path between the SBC and UE 2 by sending the session data from the selected SBC proxy candidate address to the selected UE 2 second candidate address.

In the method 1100, sending is achieved by transmitting via a transmitter of the sending device, e.g., SBC transmitter 630. In the method 1100, receiving is achieved by receiving via a receiver of the receiving device, e.g., SBC receiver 632.

In some embodiments, in step 1132 only a single connectivity check will be performed at a time as described in connection with the method 400 of FIG. 4 and hence only one of the sub-steps 1134, 1136, 1138 and 1140 will be performed and acted upon in the following steps of the method prior to the next connectivity check being received.

Figure 7:
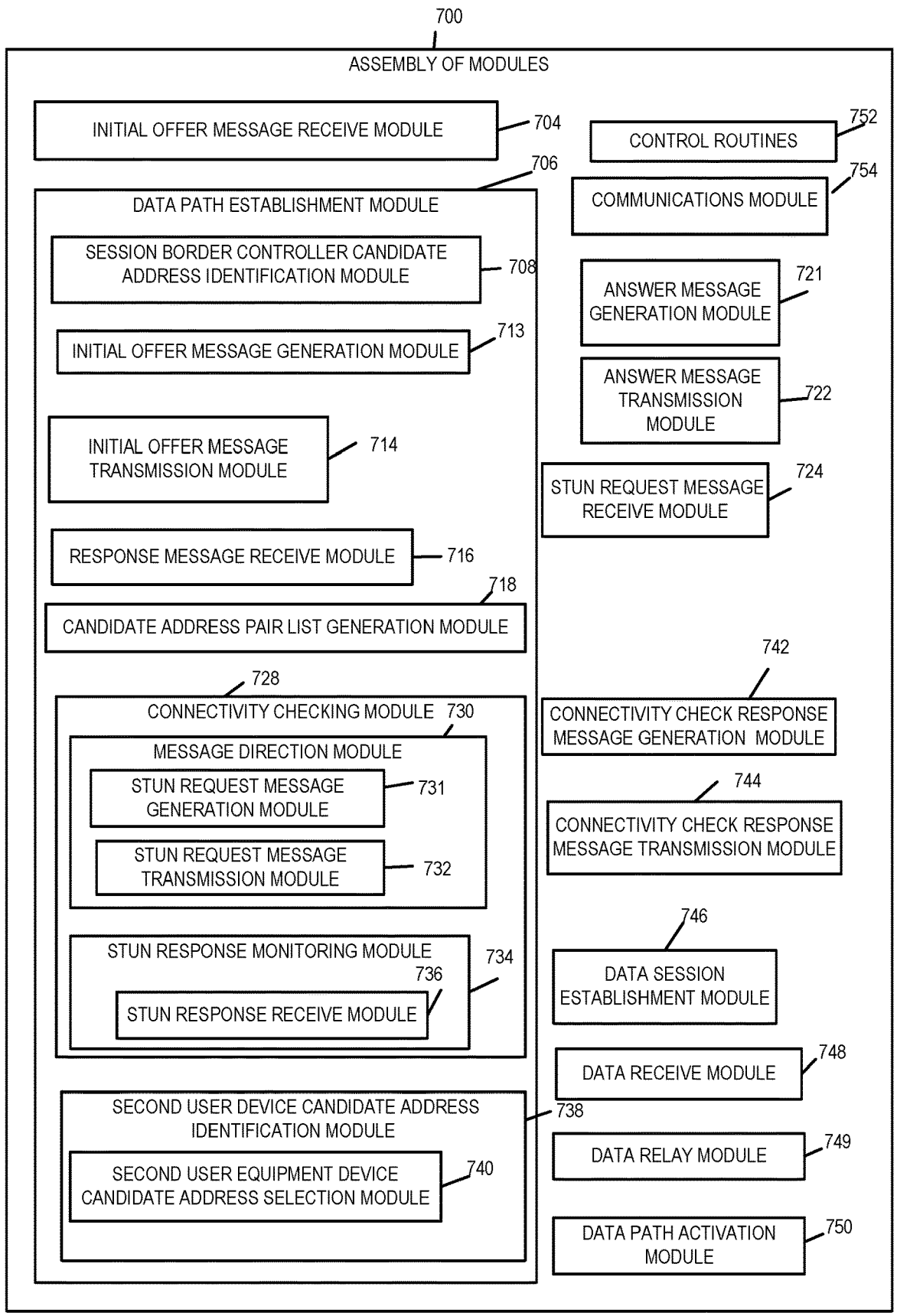
FIG. 7 illustrates an assembly of modules that can be used in the session border controller of FIG. 6 in some embodiments.

FIG. 7 is a drawing of assembly of modules 700 which may be, and in some embodiments is, included in exemplary SBC 600 illustrated in FIG. 6. The modules in the assembly of modules 700 may, and in some embodiments are, implemented fully in hardware within the processor 606, e.g., as individual circuits. The modules in the assembly of modules 600 may, and in some embodiments are, implemented fully in hardware within the assembly of modules 619, e.g., as individual circuits corresponding to the different modules. In other embodiments some of the modules are implemented, e.g., as circuits, within the processor 606 with other modules being implemented, e.g., as circuits within assembly of modules 619 and/or within I/O interfaces 608 and 609, external to and coupled to the processor 606. As should be appreciated the level of integration of modules on the processor and/or with some modules being external to the processor may be one of design choice.

Alternatively, rather than being implemented as circuits, all or some of the modules included in assembly of modules 700 may be implemented in software and stored in the memory 610 of the SBC 600, with the modules controlling operation of SBC 600 to implement the functions corresponding to the modules when the modules are executed by a processor, e.g., processor 606. In some such embodiments, the assembly of modules 700 is included in the memory 610 as assembly of modules 618. In still other embodiments, various modules in assembly of modules 700 are implemented as a combination of hardware and software, e.g., with another circuit external to the processor providing input to the processor 606 which then under software control operates to perform a portion of a module's function. While shown in the FIG. 6 embodiment as a single processor, e.g., computer, it should be appreciated that the processor 606 may be implemented as one or more processors, e.g., computers.

When implemented in software the modules include code, which when executed by the processor 606, configure the processor 606 to implement the function corresponding to the module. In embodiments where the assembly of modules 700 is stored in the memory 610, the memory 610 is a computer program product comprising a computer readable medium comprising code, e.g., individual code for each module, for causing at least one computer, e.g., processor 606, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 7 control and/or configure the SBC 600 or SBC 330 or elements therein such as the processor 606, to perform functions of corresponding steps illustrated in the method flowchart and signaling diagrams illustrated in FIGS. 4, 5, 10, ad 11. Thus the assembly of modules 700 includes various modules that perform functions of corresponding steps of the methods shown in FIGS. 4, 5, 10 and 11.

FIG. 7 is a drawing of an assembly of modules 700 in accordance with an exemplary embodiment. Assembly of modules 700 is, in some embodiments, included in a session border controller, e.g., a session border controller implementing the method of flowchart 1000 of FIG. 10. Assembly of modules 700 includes an initial offer message receive module 704, a data path establishment module 706, an answer message generation module 721, an answer message transmission module 722, a STUN request message receive module 724, a connectivity check response message generation module 742, a connectivity check response message transmission module 744, a data session establishment module 746, a data receive module 748, a data relay module 749, a data path activation module 750, a control routines module 752 and a communications module 754.

Initial offer message receive module 704 is configured to receive a first initial offer message from a first user equipment device directed to a second user equipment device, said initial offer message including one or more candidate addresses for the first user equipment device. Initial offer message receive module 704 is further configured to recover information communicated in the received first initial offer message, e.g., one or more candidate addresses for the first user equipment device. In some embodiments, the session border controller including assembly of modules 700 operates as an Interactive Connectivity Establishment (ICE) protocol controlled agent in relation to the first user equipment device and as an Interactive Connectivity Establishment protocol controlling user agent in relation to the second user equipment device. In some embodiments, the first initial offer message is a SIP INVITE message including one or more candidate addresses for the first user equipment device. In some embodiments, the first initial offer message traverses a Network Address Translator (NAT) device prior to being received by the session border controller.

Data path establishment module 706 is configured to establish a data path between the session border controller and the second user equipment device in response to receiving said first initial offer message prior to establishing a data session between the first user equipment device and the session border controller.

Data path establishment module 706 includes a session border controller candidate address identification module 708, an initial offer message generation module 713, an initial offer message transmission module 714, a response message receive module 716, a candidate address pair list generation module 718, a connectivity checking module 728, and a second user device candidate addresses identification module 738. Session border controller candidate address identification module 708 is configured to identify one or more candidate addresses for the session border controller. Session border controller candidate address identification module 708 is configured to identify a first candidate address for the session border controller. In some embodiments, the second user equipment device is located within a network and the first candidate address for the session border controller is a routable address in the network in which the second user equipment device is located. Session border controller candidate address identification module 708 is configured to identify additional candidate addresses for the session border controller. Initial offer message generation module 713 is configured to generate a second initial offer message including a first candidate address for the session border controller. Initial offer message transmission module 714 is configured to send, from the session border controller to the second user equipment device, the second initial offer message, said second initial offer message including a first candidate address for the session border controller. Response message receive module 716 is configured to receive, at the session border controller, a first response message from the second user equipment device in response to said second initial offer message, said first response message including one or more of the second candidate addresses for the second user equipment device. Response message receive module 716 is configured to recover one or more second candidate addresses for the second user equipment device included in the received first response message. Candidate address pair list generation module 718 is configured to generate a list of session border controller and second user equipment device candidate address pairs.

Connectivity checking module 728 is configured to perform a connectivity check on one or more of the candidate address pairs included in the generated list of candidate address pairs. In some embodiments, connectivity checking module 728 is configured to perform a connectivity check on each of the candidate address pairs on the generated list of session border controller and second user equipment device candidate address pairs. In some embodiments, connectivity checking module 728 is configured to perform a connectivity check on each of the candidate address pairs on the generated list of candidate address pairs in parallel.

Connectivity checking module 728 includes a message direction module 730 and a STUN response monitoring module 734. Message direction module 730 is configured to use one or more of the second candidate addresses for the second user equipment device to direct messages to the second user equipment device. Message direction module 730 includes a STUN message generation module 731 and STUN request message transmission module 732. STUN message generation module 731 is configured to generate a session traversal utilities for NAT (STUN) request message to be sent to the second user equipment device using the candidate address of the second user equipment device being checked. STUN request message transmission module 732 is configured to send a generated STUN request message to the second user equipment device using the candidate address of the second user equipment device being checked. STUN response monitoring module 734 is configured to monitor for response to STUN messages which were sent to the second user equipment device, e.g., by module 732. STUN response monitoring module 734 includes STUN response receive module 736. STUN response receive module 736 is configured to receive a response to a STUN request message from the second user equipment device, said receiving indicating success of said connectivity check. In some embodiments, STUN response receive module 736 is configured to identify a connectivity check corresponding to a candidate address pair as being successful when a response is received. In some embodiments, STUN response receive module 736 is configured to identify a connectivity check corresponding to a candidate address pair as being unsuccessful when a response is not received, e.g., within a predetermined time.

Second user device candidate address identification module 738 is configured to identify from the one or more candidate addresses for the second user equipment device an address to use for communications with the second user equipment device for the data path, e.g. data path between the SBC and the second user equipment device. Second user device candidate address identification module 738 includes a second user equipment device candidate address selection module 740, which is configured to select the second user equipment device candidate address to use for the data path from one of the candidate address pairs that successfully passed its connectivity check. In some embodiments, second user equipment device candidate address selection module 740 is configured to select the first candidate address pair to pass its connectivity check as the pair of addresses to use for the data path between the session border controller and the second user equipment device.

Answer message generation module 721 is configured to generate an answer message, in response to the received first initial offer message and prior to completing the said establishing of said data path between the session border controller and the second user equipment device, said answer message including a candidate address for the session border controller, said answer message to be sent to the first user equipment device. Answer message transmission module 722 is configured to send, from the session border controller, to the first user equipment device the generated answer message in response to the received first initial offer message and prior to completing said establishing said data path between the session border controller and said second user equipment device, said answer message including a candidate address for the session border controller. In some embodiments, the session border controller including assembly of modules 700 operates as an ICE protocol controlled agent in relation to the first user equipment device and as an ICE protocol controlling user agent in relation to the second user equipment device. In some embodiments, the answer message generated by module 721 and transmitted by module 722 is a SIP 18X message including a Session Description Protocol message, said Session Description Protocol message including the session border controller candidate address, said candidate address being routable in the network in which the first user equipment device is located.

STUN request message receive module 724 is configured to receive, at the session border controller, at least one STUN request message from the first user equipment device. STUN request message receive module 724 is configured to recover, at the session border controller, information included in a received STUN request message from the first user equipment device.

Connectivity check response message generation module 742 is configured to generate a response message in response to a connectivity check message from the first user equipment device. Connectivity check response message transmission module 744 is configured to send from the session border controller to the first user equipment device using one of the one of more candidate addresses for the first user equipment device a generated response message in response to a connectivity check message from the first user equipment device after establishing the data path between the session border controller and the second user equipment device.

Data session establishment module 746 is configured to establish a data session between the session border controller and the first user equipment device using a candidate address for the first user equipment device selected by the first user equipment device. Data receive module 748 is configured to receive data at the session border controller from the first user equipment device. Data relay module 749 is configured to relay received data, e.g., received by module 748 from the first user equipment device, to the second user equipment device over the data path established between the session border controller and the second user equipment device. In various embodiments, data relay module 749 generates messages, e.g., relay messages, including received data originating from the first user equipment device which is intended to be delivered to the second user equipment device.

Data path activation module 750 is configured to activate a data path between the session border controller and the second user equipment device. In some embodiments, data path activation module 750 is configured to activate the established data path between the session border controller and the user equipment device prior to establishing a data session between the first user equipment device and the session border controller. In some embodiments, the data path activation module 750 is configured to activate the data path between the session border controller and the second user equipment device prior to sending the response to a connectivity check message from the first user equipment device.

The control routines module 752 is configured to control various operations of the SBC. The communications module 754 is configured to perform protocol communications functions for the SBC.

Figure 9:
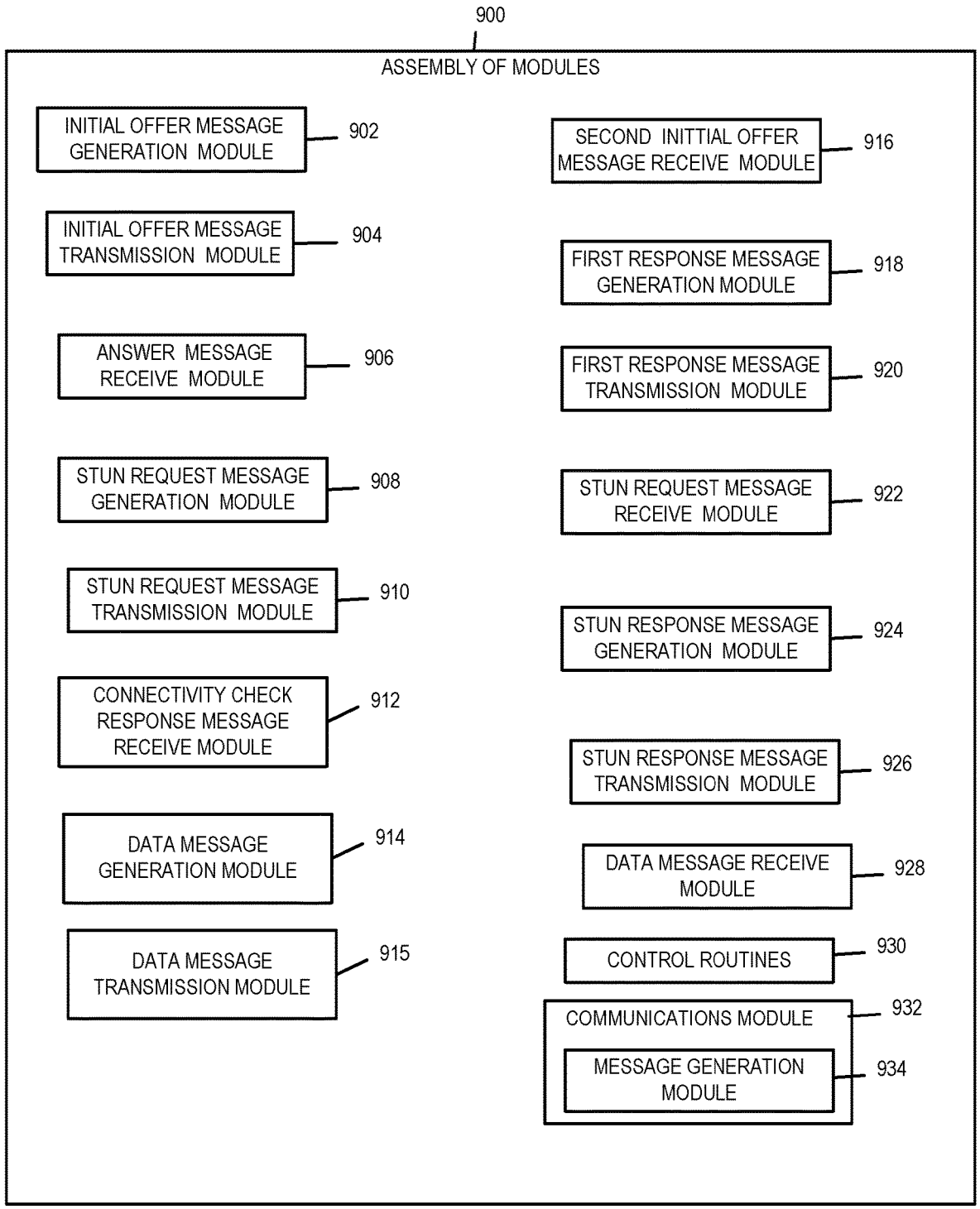
FIG. 9 illustrates and assembly of modules that can be used in a communications device, e.g., user device 800 of FIG. 8 in accordance with an embodiment of the present invention.

FIG. 9 is a drawing of assembly of modules 900 which may be, and in some embodiments is, included in exemplary communications device, user device 800, illustrated in FIG. 8. The modules in the assembly of modules 900 may, and in some embodiments are, implemented fully in hardware within the processor 806, e.g., as individual circuits. The modules in the assembly of modules 900 may, and in some embodiments are, implemented fully in hardware within the assembly of modules 819, e.g., as individual circuits corresponding to the different modules. In other embodiments some of the modules are implemented, e.g., as circuits, within the processor 806 with other modules being implemented, e.g., as circuits within assembly of modules 819 and/or within I/O interfaces 808 and 809, external to and coupled to the processor 806. As should be appreciated the level of integration of modules on the processor and/or with some modules being external to the processor may be one of design choice.

Alternatively, rather than being implemented as circuits, all or some of the modules included in assembly of modules 900 may be implemented in software and stored in the memory 810 of the user equipment device 800, with the modules controlling operation of user equipment device 800 to implement the functions corresponding to the modules when the modules are executed by a processor, e.g., processor 806. In some such embodiments, the assembly of modules 900 is included in the memory 810 as assembly of modules 818. In still other embodiments, various modules in assembly of modules 900 are implemented as a combination of hardware and software, e.g., with another circuit external to the processor providing input to the processor 806 which then under software control operates to perform a portion of a module's function. While shown in the FIG. 8 embodiment as a single processor, e.g., computer, it should be appreciated that the processor 806 may be implemented as one or more processors, e.g., computers.

When implemented in software the modules include code, which when executed by the processor 806, configure the processor 806 to implement the function corresponding to the module. In embodiments where the assembly of modules 900 is stored in the memory 810, the memory 810 is a computer program product comprising a computer readable medium comprising code, e.g., individual code for each module, for causing at least one computer, e.g., processor 806, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 9 control and/or configure the user equipment device 800 or user equipment devices 302 and 360 when implemented in accordance with user equipment device 800 or elements within user equipment device 800, 302 or 360 therein such as the processor 806, to perform functions of corresponding steps illustrated in the method flowchart and signaling diagrams illustrated in FIGS. 4, 5, 10, ad 11. Thus the assembly of modules 900 includes various modules that perform functions of corresponding steps of the methods shown in FIGS. 4, 5, 10 and 11.

FIG. 9 is a drawing of an assembly of modules 900 in accordance with an exemplary embodiment. Assembly of modules 900 is, e.g., included in a user equipment device. The user equipment device including assembly of module 900 is, e.g., a first user equipment device or a second user equipment device. The user equipment device including assembly of modules 900 operate, during some time intervals, as the first user equipment device with regard to flowchart 1000 of FIG. 10. The user equipment device including assembly of modules 900 operate, during some time intervals as the second user equipment device with regard to flowchart 1000 of FIG. 10. Assembly of module 900 includes an initial offer message generation module 902, an initial offer message transmission module 904, an answer message receive module 906, a STUN request message generation module 908, a STUN request message transmission module 910, a connectivity check response message receive module 912, a data message generation module 914, a data message transmission module 915, a second initial offer message receive module 916, a first response message generation module 918, a first response message generation module 918, a first response message transmission module 920, a STUN request message receive module 922, a STUN response message generation module 924, a STUN response message transmission module 926, a data message receive module 928, a control routines module 930, and a communications module 932 which includes a message generation module 934.

In some embodiments, modules 902, 904, 906, 908, 910, 912, 914 and 915 are used by the user equipment device including assembly of modules 900 when the user equipment device is operating as a first user equipment device. In some embodiments, modules 916, 918, 920, 922, 924, 926 and 928 are used by the user equipment device including assembly of modules 900 when the user equipment device is operating as a second user equipment device.

Initial offer generation module 902 is configured to generate, at the first user equipment device, a first initial offer message directed to a second user equipment device, said first initial offer message including one or more candidate addresses for the first user equipment device. Initial offer message transmission module 904 is configured to send the generated first initial offer message directed toward the second user equipment device. In some embodiments, the first initial offer message is a SIP INVITE message including a Session Description protocol message including one or more candidate addresses for the first user equipment device. In some embodiments, the first initial offer message is received by a session border controller operating as an Interactive Connectivity Establishment (ICE) protocol controlled agent in relation to the first user equipment device and as an Interactive Connectivity Establishment protocol controlling user agent in relation to the second user equipment device. In some embodiments, the first initial offer message traverses a Network Address Translator (NAT) device prior to being received by the session border controller.

Answer message receive module 906 is configured to received from the session border controller an answer message in response to the first initial offer message and prior to completing establishment of a data path between the session border controller and the second user equipment device, said answer message including a candidate address for the session border controller. Answer message receive module 906 is further configured to recover the information communicated in the received response message, e.g., the communicated candidate address for the session border controller.

STUN request message generation module 908 is configured to generate, at the first user equipment device, at least one STUN request message, e.g., a STUN request message which is subsequently received by the SBC. STUN request message transmission module 910 is configured to send from the first user equipment device the generated STUN request message, e.g., which is subsequently received by the SBC.

Connectivity check response message receive module 912 is configured to receive on one of the one or more candidate addresses for the first user equipment device a response to a connectivity check message from the first user equipment device, e.g., a response to a STUN message generated by module 908 and sent by module 910, after the data path has been established between the session border controller and the second user equipment device. Connectivity check response message receive module 912 is further configured to recover the information communicated in the received response message. In various embodiments, connectivity check response message receive module 912 determines that the connectivity check was successful if a response is received to the STUN request message that it previously sent.

Data message generation module 914 is configured to generate a message including data to be communicated to the second user equipment device, e.g., via the session border controller. Data message transmission module 915 is configured to send the generated data message including the data to be communicated to the second user equipment device to the session border controller.

Second initial offer message receive module 916 is configured to receive at the second user equipment device a second initial offer message, said second initial offer message including a first candidate address for the session border controller. The second initial offer message may, and sometimes does include additional candidate addresses for the session border controller in addition to the first candidate address. Second initial offer message receive module 916 is configured to recover information communicated in the second initial offer message including the first candidate address for the session border controller and, in some embodiments, additional candidate addresses for the session border controller.

First response message generation module 918 is configured to generate, at the second user equipment device, a first response message in response to a received second initial offer message, said first response message including one or more second candidate addresses for the second user equipment device. First response message transmission module 920 is configured to send the generated first response message to the session border controller, said first response message including one or more second candidate addresses for the second user equipment device.

STUN request message receive module 922 is configured to receive, at the second user equipment device, a STUN request message using a candidate address of the second user equipment device being checked. In various embodiments, a received STUN message corresponds to a candidate address pair included in a session border controller generated list of session border controller and second user equipment device candidate address pairs.

STUN response message generation module 924 is configured to generate, at the second user equipment device, a STUN response message in response to a received STUN request message. STUN response message transmission module 926 is configured to send from the second user equipment device, a generated STUN response message to the session border controller.

Data message receive module 928 is configured to receive at the second user equipment device data which originated from the first user equipment device and which was relayed to the second user equipment device, via the session border controller, over the data path established between the session border controller and the second user equipment device.

Control routines module 930 is configured to control the operation of the user device including storing and retrieving information from memory.

Communications module 932 is configured to perform communications protocol functions for the user device.

Message generation sub-module 934 is configured to generate messages such as for example SIP protocol messages, SDP messages and RTP messages.

It should be appreciated that while the exemplary apparatus, systems and method embodiments described have mainly focused on describing and explaining how to prevent and/or minimize clipping for a media/data stream originating from UE 1 the same techniques can be used to prevent and/or minimize clipping for the stream sent toward UE 1 from UE 2. The invention can be used to prevent media/data clipping of a media/data stream in any direction.

Various additional features and embodiments of the invention will now be discussed in further detail. It should be appreciated that not necessarily all embodiments include the same features and some of the features described are not necessary but can be desirable in some embodiments.

A session border controller in accordance with a first embodiment comprises: a first receiver; and a processor configured to control said session border controller to: (i) receive, by said first receiver, a first initial offer message from a first user equipment device directed to a second user equipment device, said initial offer message including one or more candidate addresses for the first user equipment device; and (ii) establish a data path between the session border controller and the second user equipment device in response to receiving said first initial offer message prior to establishing a data session between the first user equipment device and the session border controller. In some embodiments, the processor of the session border controller is further configured to control said session border controller to operate as an Interactive Connectivity Establishment (ICE) protocol controlled agent in relation to the first user equipment device and as an Interactive Connectivity Establishment protocol controlling user agent in relation to the second user equipment device.

In some embodiments, the first initial offer message is a SIP INVITE message including a Session Description Protocol message, said Session Description Protocol message including the one or more candidate addresses for the first user equipment device. In some embodiments, the first initial offer message traverses a Network Address Translator (NAT) device prior to being received by the session border controller.

In some embodiments, the processor of the session border controller of the first embodiment is further configured to control said session border controller to activate the established data path between the session border controller and the second user equipment device prior to establishing a data session between the first user equipment device and the session border controller.

A second session border controller embodiment in which the session border controller of the first embodiment further comprises: a first transmitter and a second receiver. The processor of the second session border controller embodiment as part of being configured to control said session border controller to establish a data path between the session border controller and the second user equipment device includes being configured to control said session border controller to: (i) transmit, from said first transmitter, to the second user equipment device a second initial offer message, said second initial offer message including a first candidate address for the session border controller; (ii) receive, at the second receiver, a first response message from the second user equipment device in response to the second initial offer message, the first response message including one or more second candidate addresses for the second user equipment device; and (iii) use one of the one or more second candidate addresses for the second user equipment device to direct messages to the second user equipment device.

In some embodiments, the processor of the session border controller of the second embodiment as part of being configured to control said session border controller to establish a data path between the session border controller and the second user equipment device includes being configured to control said session border controller to identify from the one or more candidate addresses for the second user equipment device an address to use for communications with the second user equipment device for the data path. In some of such embodiments, the session border controller of the processor is further configured to control said session border controller as part of said establish a data path between the session border controller and the second user equipment device to: (i) identify a first candidate address for the session border controller; (ii) generate a list of session border controller and second user equipment device candidate address pairs; and (iii) perform a connectivity check on one or more of the candidate address pairs included in the generated list of candidate addresses.

In some embodiments, the second user equipment device is located within a network and the first candidate address for the session border controller is a routable address in the network in which the second user equipment device is located.

In some embodiments, the session border controller further comprises: a second transmitter and the processor is further configured to control said session border controller as part of said performing a connectivity check to: transmit from said second transmitter a Session Traversal Utilities for NAT (STUN) request message to the second user equipment device using the candidate address of the second user equipment device being checked.

In some embodiments, the session border controller the processor is further configured to control said session border controller to select the second user equipment device candidate to use for communications with the second user equipment device for the data path from one of the candidate address pairs that successfully passed said connectivity check as part of being configured to control said session border controller to identify from the one or more candidate addresses for the second user equipment device an address to use for communications with the second user equipment device for the data path.

The processor of the session border controller may be, and in some embodiments is, further configured to control the session border control to perform the connectivity checks for each of the candidate address pairs in parallel.

In some embodiments, the processor is further configured to control the session border controller to select the first candidate address pair to pass the connectivity check as the pair of addresses to use for the data path between the session border controller and the second user equipment device.

In some embodiments, the session border controller of the first embodiment also includes: a first transmitter and the processor is further configured to control said first transmitter to transmit from the session border controller to the first user equipment device an answer message in response to the first initial offer message and prior to completing the establishing of said data path between the session border controller and the second user equipment device, said answer message including a candidate address for the session border controller.

In some such embodiments, the processor of the session border controller is further configured to control the session border controller to operate as an Interactive Connectivity Establishment (ICE) protocol controlled agent in relation to the first user equipment device and as an Interactive Connectivity Establishment protocol controlling user agent in relation to the second user equipment device.

The answer message may be, and in some embodiments is, a SIP 18X message including a Session Description Protocol message, said Session Description Protocol message including the session border controller candidate address, said candidate address being routable in the network in which the first user equipment device is located.

The session border controller may, and in some embodiments does, include: a second transmitter and the processor is further configured to control the second transmitter to transmit from the session border controller to one of the one or more candidate addresses for the first user equipment device a response to a connectivity check message from the first user device after establishing the data path between the session border controller and the second user equipment device. In some of such embodiments, the processor is further configured to activate said data path between the session border controller and the second user equipment device prior to sending said response to a connectivity check message from the first user equipment device.

In some embodiments, the processor is further configured to control said session border controller to establish a data session between the session border controller and the first user equipment device using a candidate address for the first user device selected by the first user equipment device.

The session border controller may, and sometimes does, also include: a second receiver and the processor is further configured to control said session border controller to: (i) receive at the second receiver of the session border controller data from the first user equipment device, and (ii) relay said data to the second user equipment device over said established data path between the session border controller and the second user equipment device.

A third session border controller embodiment of the invention includes the first session border controller embodiment wherein the processor is further configured to control said session border controller as part of establishing a data path between the session border controller and the second user equipment device to: (i) send, from the session border controller, to the second user equipment device a second initial offer message, said second initial offer message including a proxy candidate address for the session border controller for each candidate address for the first user device received in the first initial offer message; (ii) receive, at the session border controller, a first response message from the second user equipment device in response to the second initial offer message, the first response message including one or more second candidate addresses for the second user equipment device; and use one of the one or more second candidate addresses for the second user equipment device to direct messages to the second user equipment device.

In some such embodiments, the processor is further configured to control said session border controller as part of establishing a data path between the session border controller and the second user equipment device to identify from the one or more candidate addresses for the second user equipment device an address to use for communications with the second user equipment device for the data path.

The processor may be, and in some embodiments is, further configured to control said session border controller to send and/or transmit, from the session border controller, to the first user equipment device a response message to the first initial offer message from the first user device, said response message to the first initial offer message from the first user device including a proxy candidate address for the session border controller for each candidate address for the second user equipment device received in the first response message from the second user device.

A non-transitory computer readable medium including processor executable instructions for use in a session border controller, the non-transitory computer readable medium comprising: instructions which when executed by at least one processor in the session border controller controls said session border controller to: receive a first initial offer message from a first user equipment device directed to a second user equipment device, said initial offer message including one or more candidate addresses for the first user equipment device; and establish a data path between the session border controller and the second user equipment device in response to receiving said first initial offer message prior to establishing a data session between the first user equipment device and the session border controller.

The techniques of various embodiments may be implemented using software, hardware and/or a combination of software and hardware. Various embodiments are directed to apparatus, e.g., session border controllers, communications devices, user devices, telecommunications systems, network nodes and/or network equipment devices. Various embodiments are also directed to methods, e.g., method of controlling and/or operating, communications devices, session border controllers, TURN servers, STUN servers, NAT, telecommunications equipment, network nodes and/or network equipment devices. Servers may be implemented on processors of devices such as computers and network equipment devices. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of the elements or steps are implemented using hardware circuitry. In some embodiments, each of the elements or steps are implemented using an application specific integrated circuit.

In various embodiments nodes and/or elements described herein are implemented using one or more modules to perform the steps corresponding to one or more methods, for example, message reception, message generation, signal processing, sending, determining and/or transmission steps. Thus, in some embodiments various features are implemented using modules or in some embodiments logic such as for example logic circuits. Such modules may be implemented using software, hardware or a combination of software and hardware. In some embodiments, one or more modules may be implemented as hardware circuitry in a processor. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., session border controller, including a processor configured to implement one, multiple or all of the steps of one or more methods of the invention.

In some embodiments, the processor or processors, e.g., CPUs, of one or more devices, e.g., session border controllers, communications devices, user equipment devices are configured to perform the steps of the methods described as being performed by the device, e.g., session border controller or user equipment device. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., communications node or device such as a session border controller or user device, with a processor which includes a module corresponding to each of the steps of the various described methods performed by the device in which the processor is included. In some but not all embodiments a device, e.g., communications node such as a session border controller, includes a module corresponding to each of the steps of the various described methods performed by the device in which the processor is included. The modules may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a session border controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a session border controller or other device described in the present application.

In some embodiments, the steps are implemented with hardware circuitry specifically designed and/or dedicated to perform the step in a highly efficient and computation fast manner at or approaching wire speed.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method of operating a session border controller, the method comprising:
    receiving, at the session border controller, a first initial offer message from a first user equipment device directed to a second user equipment device, said first initial offer message including one or more candidate addresses for the first user equipment device;
    establishing a data path between the session border controller and the second user equipment device in response to receiving said first initial offer message prior to establishing a data session between the first user equipment device and the session border controller, said establishing a data path between the session border controller and the second user equipment device including: (i) identifying a first candidate address for the session border controller, (ii) generating a list of session border controller and second user equipment device candidate address pairs, and (iii) performing a successful connectivity check on one or more of the candidate address pairs included in the generated list of candidate address pairs;
    prior to completing said establishing a data path between the session border controller and the second user equipment device, sending, from the session border controller, to the first user equipment device an answer message in response to the first initial offer message, said answer message including a second candidate address for the session border controller;
    waiting, by the session border controller, to respond to any connectivity check messages received by the session border controller from the first user equipment device prior to the completing of said establishing a data path between the session border controller and the second user equipment device as part of establishing the data session between the first user equipment device and the session border controller;
    sending, from the session border controller, to one of the one or more candidate addresses for the first user equipment device a response to a connectivity check message from the first user equipment device after establishing the data path between the session border controller and the second user equipment device; and
    establishing the data session between the first user equipment device and the session border controller after establishing the data path between the session border controller and the second user equipment device.

2. The method of claim 1 wherein said establishing a data path between the session border controller and the second user equipment device further includes:
    sending, from the session border controller, to the second user equipment device a second initial offer message, said second initial offer message including the first candidate address for the session border controller;
    receiving, at the session border controller, a first response message from the second user equipment device in response to the second initial offer message, the first response message including one or more second candidate addresses for the second user equipment device; and using one of the one or more second candidate addresses for the second user equipment device to direct messages to the second user equipment device.

3. The method of claim 2 wherein said establishing a data path between the session border controller and the second user equipment device further includes identifying from the one or more candidate addresses for the second user equipment device an address to use for communications with the second user equipment device for the data path.

4. The method of claim 1 wherein connectivity checks are performed for each of the candidate address pairs in parallel.

5. The method of claim 1 wherein said establishing a data session between the session border controller and the first user equipment device includes using a candidate address for the first user equipment device selected by the first user equipment device.

6. The method of claim 5 further including receiving data at the session border controller from the first user equipment device and relaying said data to the second user equipment device over said data path established between the session border controller and the second user equipment device.

7. The method of claim 1 wherein said establishing a data path between the session border controller and the second user equipment device includes:

sending, from the session border controller, to the second user equipment device a second initial offer message, said second initial offer message including a proxy candidate address for the session border controller for each candidate address for the first user equipment device received in the first initial offer message, said first candidate address for the session border controller being a first proxy candidate address for the session border controller for a first candidate address for the first user equipment device received in the first offer message;

receiving, at the session border controller, a first response message from the second user equipment device in response to the second initial offer message, the first response message including one or more second candidate addresses for the second user equipment device; and using one of the one or more second candidate addresses for the second user equipment device to direct messages to the second user equipment device.

8. The method of claim 7 wherein said establishing a data path between the session border controller and the second user equipment device further includes identifying from the one or more candidate addresses for the second user equipment device an address to use for communications with the second user equipment device for the data path.

9. The method of claim 7 wherein said answer message to the first initial offer message from the first user equipment device includes a proxy candidate address for the session border controller for each candidate address for the second user equipment device received in the first response message from the second user equipment device, said second candidate address for the session border controller being a second proxy candidate address for the session border controller for one of the one or more second candidate addresses for the second user equipment device received in the first response message from the second user equipment device.

10. The method of claim 1,
wherein said first user equipment device and said second user equipment device are Interactive Connectivity Establishment (ICE) endpoint devices, ICE endpoint devices being endpoint devices which support the ICE protocol.

11. The method of claim 10,
wherein said first initial offer message is a first Session Description Protocol (SDP) offer message included in a first Session Initiation Protocol (SIP) Invite message; and wherein said answer message is a second Session Description Protocol (SDP) message included in a SIP 18X message.

12. A session border controller comprising:
a first receiver;
a first transmitter; and
a processor configured to control said session border controller to:
receive, by said first receiver, a first initial offer message from a first user equipment device directed to a second user equipment device, said first initial offer message including one or more candidate addresses for the first user equipment device;
establish a data path between the session border controller and the second user equipment device in response to receiving said first initial offer message prior to establishing a data session between the first user equipment device and the session border controller, said establish a data path between the session border controller and the second user equipment device including: (i) identifying a first candidate address for the session border controller, (ii) generating a list of session border controller and second user equipment device candidate address pairs, and (iii) performing a successful connectivity check on one or more of the candidate address pairs included in the generated list of candidate address pairs;
prior to completing said establish a data path between the session border controller and the second user equipment device, send, from the session border controller, to the first user equipment device an answer message in response to the first initial offer message, said answer message including a second candidate address for the session border controller;
wait to respond to any connectivity check messages received by the session border controller from the first user equipment device prior to the completing of said establishing a data path between the session border controller and the second user equipment device as part of establishing the data session between the first user equipment device and the session border controller;
transmit, from the first transmitter, to one of the one or more candidate addresses for the first user equipment device a response to a connectivity check message from the first user equipment device after establishing the data path between the session border controller and the second user equipment device; and
establish the data session between the first user equipment device and the session border controller after establishing the data path between the session border controller and the second user equipment device.

13. The session border controller of claim 12 further comprising:
a second receiver; and
wherein said processor as part of being configured to control said session border controller to establish a data path between the session border controller and the second user equipment device includes being configured to control said session border controller to:

transmit, from said first transmitter, to the second user equipment device a second initial offer message, said second initial offer message including the first candidate address for the session border controller;

receive, at the second receiver, a first response message from the second user equipment device in response to the second initial offer message, the first response message including one or more second candidate addresses for the second user equipment device; and use one of the one or more second candidate addresses for the second user equipment device to direct messages to the second user equipment device.

14. The session border controller of claim 13 wherein said processor as part of being configured to control said session border controller to establish a data path between the session border controller and the second user equipment device includes being configured to control said session border controller to identify from the one or more candidate addresses for the second user equipment device an address to use for communications with the second user equipment device for the data path.

15. The session border controller of claim 12 wherein said processor is further configured to control said session border controller to perform connectivity checks for each of the candidate address pairs in parallel.

16. The session border controller of claim 12, wherein said processor is further configured to control said session border controller as part of establishing a data path between the session border controller and the second user equipment device to:

send, from the session border controller, to the second user equipment device a second initial offer message, said second initial offer message including a proxy candidate address for the session border controller for each candidate address for the first user equipment device received in the first initial offer message, said first candidate address for the session boarder controller being a first proxy candidate address for the session border controller for a first candidate address for the first user equipment device received in the first offer message;

receiving, at the session border controller, a first response message from the second user equipment device in response to the second initial offer message, the first response message including one or more second candidate addresses for the second user equipment device; and using one of the one or more second candidate addresses for the second user equipment device to direct messages to the second user equipment device.

17. The session border controller of claim 12 wherein said to establish a data session between the session border controller and the first user equipment device includes using a candidate address for the first user equipment device selected by the first user equipment device.

18. The session border controller of claim 12,
wherein said first initial offer message is a first Session Description Protocol (SDP) offer message included in a first Session Initiation Protocol (SIP) Invite message;
wherein said answer message is a second Session Description Protocol (SDP) message included in a SIP 18X message; and
wherein said first user equipment device and said second user equipment device are Interactive Connectivity Establishment (ICE) endpoint devices, ICE endpoint devices being endpoint devices which support the ICE protocol.

19. A non-transitory computer readable medium including a first set of computer executable instructions which when executed by a processor of a session border controller cause the session border controller to:

receive a first initial offer message from a first user equipment device directed to a second user equipment device, said first initial offer message including one or more candidate addresses for the first user equipment device;

establish a data path between the session border controller and the second user equipment device in response to receiving said first initial offer message prior to establishing a data session between the first user equipment device and the session border controller, said establish a data path between the session border controller and the second user equipment device including: (i) identifying a first candidate address for the session border controller, (ii) generating a list of session border controller and second user equipment device candidate address pairs, and (iii) performing a successful connectivity check on one or more of the candidate address pairs included in the generated list of candidate address pairs;

prior to completing said establish a data path between the session border controller and the second user equipment device, send, from the session border controller, to the first user equipment device an answer message in response to the first initial offer message, said answer message including a second candidate address for the session border controller;

wait, by the session border controller, to respond to any connectivity check messages received by the session border controller from the first user equipment device prior to the completing of said establishing a data path between the session border controller and the second user equipment device as part of establishing the data session between the first user equipment device and the session border controller;

send, from the session border controller, to one of the one or more candidate addresses for the first user equipment device a response to a connectivity check message from the first user equipment device after establishing the data path between the session border controller and the second user equipment device; and establish the data session between the first user equipment device and the session border controller after establishing the data path between the session border controller and the second user equipment device.

20. The non-transitory computer readable medium of claim 19,
wherein said to establish a data path between the session border controller and the second user equipment device further includes:

sending, from the session border controller, to the second user equipment device a second initial offer message, said second initial offer message including the first candidate address for the session border controller;

receiving, at the session border controller, a first response message from the second user equipment device in response to the second initial offer message, the first response message including one or more second candidate addresses for the second user equipment device; and using one of the one or more second candidate addresses for the second user equipment device to direct messages to the second user equipment device.

* * * * *